(12) United States Patent
Pasadyn

(10) Patent No.: US 6,757,579 B1
(45) Date of Patent: Jun. 29, 2004

(54) KALMAN FILTER STATE ESTIMATION FOR A MANUFACTURING SYSTEM

(75) Inventor: Alexander J. Pasadyn, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 0 days.

(21) Appl. No.: 10/209,758

(22) Filed: Jul. 31, 2002

Related U.S. Application Data

(60) Provisional application No. 60/318,792, filed on Sep. 13, 2001.

(51) Int. Cl.[7] .......................... G05B 13/02; G06F 19/00
(52) U.S. Cl. .......................... 700/108; 700/29; 700/44; 700/52; 702/188
(58) Field of Search .......................... 700/28–30, 38, 700/44, 45, 47, 51, 52, 54, 55, 95, 96, 108; 702/188

(56) References Cited

U.S. PATENT DOCUMENTS

| | | | | |
|---|---|---|---|---|
| 5,115,391 A | * | 5/1992 | Puthenpura et al. | 700/32 |
| 5,654,907 A | * | 8/1997 | Lange | 702/104 |
| 5,682,309 A | | 10/1997 | Bartusiak et al. | 700/29 |
| 5,687,077 A | * | 11/1997 | Gough, Jr. | 700/29 |
| 5,865,665 A | | 2/1999 | Yueh | 451/5 |
| 5,918,200 A | | 6/1999 | Tsutsui et al. | 702/180 |
| 6,092,033 A | * | 7/2000 | Uhlmann | 702/189 |
| 6,163,730 A | | 12/2000 | Hayner | 700/54 |
| 6,285,971 B1 | * | 9/2001 | Shah et al. | 703/2 |
| 6,519,498 B1 | | 2/2003 | Jevtic et al. | 700/101 |
| 6,584,369 B2 | | 6/2003 | Patel et al. | 700/100 |
| 6,609,036 B1 | * | 8/2003 | Bickford | 700/30 |
| 2002/0026249 A1 | * | 2/2002 | Rasmussen et al. | 700/51 |

FOREIGN PATENT DOCUMENTS

EP 1052558 A1 11/2000

OTHER PUBLICATIONS

J. Alster and P. R. Belanger. A technique for dual adaptive control. *Automatica*, 10:627–634, 1974.

S. P. Asprey, S. Macchietto, and C. C. Pantelides. Robust optimal designs for dynamic experiments. In *International Symposium on Advanced Control of Chemical Prosesses*, pp. 869–874. IFAC, 2000.

(List continued on next page.)

*Primary Examiner*—Paul Rodriguez
(74) *Attorney, Agent, or Firm*—Williams, Morgan & Amerson

(57) ABSTRACT

A method for monitoring a manufacturing system includes defining a plurality of observed states associated with the manufacturing system. State estimates are generated for the observed states. An uncertainty value is generated for each of the state estimates. Measurement data associated with an entity in the manufacturing system is received. The state estimates are updated based on the measurement data and the uncertainty values associated with the state estimates. A system for monitoring a manufacturing system includes a controller configured to define a plurality of observed states associated with the manufacturing system, generate state estimates for the observed states, generate an uncertainty value for each of the state estimates, receive measurement data associated with an entity in the manufacturing system, and update the state estimates based on the measurement data and the uncertainty values associated with the state estimates.

37 Claims, 15 Drawing Sheets

OTHER PUBLICATIONS

K. J. Astrom. Moving average and self–tuning control. *Int. J. Adapt. Control Signal Process*, 13:451–467, 1999.

K. J. Astrom and B. Wittenmark. On self–tuning regulators. *Automatica*, 9:185–199, 1973.

R. Johansson and A. Robertsson. Stability analysis of adaptive output feedback systems. In *Proceedings of the 37th IEEE Conference on Decision and Control*, pp. 4008–4009, 1998.

K. Young and S. Lee. A stabilizing controller for multirate sampled–data systems. *SICE*, PR0001–3/95/0000:1577–1582, Jul. 1995.

B. Ko. *Assessment of achievable closed–loop performance and model–based controller tuning strategies*. PhD Research Proposal, The University of Texas at Austin, 1998.

P.J. Lawrence. Data reconciliation: Getting better information. *Hydrocarbon Processing*. 55–60, 1989.

D. Bonvin. Optimal operation of batch reactors–a personal view. *Journal of Process Control*, 8(5–6):355–368, 1998.

J. Moyne, R. Telfeyan, A. Hurwitz and J. Tayler. A process–independent run–to–run controller and its application to chemical –mechanical planarization 10/95.

H. Mortazavian. Supervisory control and partial information on controllability and observability. *IEEE*, 348–351,1993.

K. J. Astrom and B. Wittenmark. Real–time parameter estimation. 59–99, 1989.

M. E. Bradley and S. Lenhart. Short communication: Bilinear optimal control of a kirchoff plate to a desired profile. *Optimal Control Applications and Methods*, 18(3):217–226, May/Jun. 1997.

E.F. Vogel and T.F. Edgar. An adaptive pole placement controller for chemical processes with variable dead time. *Comp. Chem. Engng*. 12 (1):15–26, 1988.

K. J. Burhnam, A. Dunoyer, and S. Marcroft. Bilinear controller with pid structure. *Computing and Control Engineering Journal*, 10(2):63–69, Apr. 1999.

J. A. Wilson and L.F.M. Zorzetto. A generalized approach to process state estimation using hybrid artificial neural network/mechanistic models. *Computers Chem. Engng*. 21(9):951–963, 1997.

W. J. Campbell. *Model Predictive Run–to–Run Control of Chemical Mechanical Planarization*. PhD thesis, The University of Texas at Austin, 1999.

B. M. Wise and N. B. Gallagher. The process chemometrics approach to process monitoring and fault detection. *J. Proc. Cont*. 6(6):329–348, 1996.

E. Del Castillo and J. Yeh. An adaptive run–to–run optimizing controller for linear and nonlinear semiconductor processes. *IEEE Transactions on Semiconductor Manufacturing*, 11(2):285–295, 1998.

B. J. Cotto Summary of the process identification workshop at the 1992 canadian chemical engineering conference. *Journal of Process Control*, 5(2):109–113, Apr. 1995.

T. F. Edgar, S. W. Butler, W. J. Campbell, C. Pfeiffer, C. Bode, S. B. Hwang, K. S. Balakrishnan, and J. Hahn. Automatic control in microelectronics manufacturing: Practices, challenges, and possibilities. *Automatica*, 36(11):1567–1603, 2000.

K. Esbensen and P. Geladi, *Principal Component Analysis*. Elsevier Science Publishers B.V., 1987.

K. G. Arvanitis and P. N. Paraskevopoulos. Design of Multidetected–output adaptive controllers. In *Proceedings of the 34th IEEE Conference on Decision and Control*, 2318–2321, 1995.

H. Fangpo and M. J. Gibbard. Design of an adaptive bilinear power system stabilizer. *Automatica*, 33(4):663–668, Apr. 1997.

S. P. Asprey and S. Macchietto. Statistical tools for optimal dynamic model building. *Computer and Chemical Engineering*. 24:1261–1267, 2000.

J. S. Baras and N. S. Patel. A framework for robust run by run control with lot delayed measurements. *Transactions on Semiconductor Manufacturing*, 10(1):75–83, IEEE, 1997.

D. Georges. The use of observability and controllability gramians or functions for optimal sensor and actuator location in finite–dimensional systems. In *Proceedings of the 34th Conference on Decision and Control*, pp. 3319–3324. IEEE, 1995.

G. C. Goodwin and D. Q. Mayne. A parameter estimation perspective of continuous time model reference adaptive control. *Automatica*, 23(1):57–70, 1987.

L. Guo and H. Schwarz. A control scheme for bilinear systems and application to a secondary controlled hydraulic rotary drive. In *Proceedings of the 28th IEEE Conference on Decision and Control*, vol. 1, pp. 542–547, 1989.

B. Castillo, A. Posniak and V. Lopez. Approximate tracking near singularities. A differential algebraic approach. In *Proceedings of the $32^{nd}$ IEEE Conference on Decision and Control*, 2778–2782, 1993.

C. M. Crowe, Y. A. Garcia Campos and A. Hrymak. Reconciliation of process flow rates by matrix projection. *AIChE Journal*, 29(6):883–888,1983.

C. M. Crowe. Reconciliation of process flow rates by matrix projection. *AIChE Journal*, 32(4):616–623, 1986.

A. Ingolfsson and E. Sachs. Stability and sensitivity of an ewma controller. *Journal of Quality Technology*, 25(4):271–287, Oct. 1993.

P. A. Ioannou and J. Sun. Theory and design of robust direct and indirect adaptive control schemes. *Int. J. Control*, 47:775–813, 1988.

A. Datta and P. Ioannou. Performance improvement versus robust stability in model reference adaptive control. In *Proceedings of the $30^{th}$ IEEE Conference on Decision and Control*, 748–753, 1991.

O. R. Gonalez and P. J. Antsaklis. Hidden modes of interconnected systems in control design. In *Proceedings of the $27^{th}$ IEEE Conference on Decision and Control*, 2066–2071, 1988.

M. L. Thompson and M. A. Kramer. Modeling chemical processes using prior knowledge and neural networks. *AIChE Journal*, 40(8):1328–1340, 1994.

F. L. Lewis, G. Maliotis, and C. Abdallah. Robust adaptive control for a class of partially known nonlinear systems. In *Proceedings of the 27th IEEE Conference on Decision and Control*, vol. 3, pp. 2425–2427, 1988.

G. M. Stanley and R. S. H. Mah. Observability and redundancy in process data estimation. *Chemical Engineering Science*, 36:259–272,1981.

D. Poddar, G. May and M. Brooke. Using multivariate nested distributions to model semiconductor manufacturing processes. *IEEE Transactions on Semiconductor Manufacturing*, 12(1):53–64,1999.

L. Ljung. Estimation focus in system identification: prefiltering, noise models, and prediction. In *Proceedings of the 38th IEEE Conference on Decision and Control*, vol. 3, pp. 2810–2815. IEEE, 1999.

S. Longhi. Necessary and sufficient conditions for the complete reachability and observability of multirate sampled-data systems. In *Proceedings Of the 31st IEEE Conference On Decision and Control*, pp. 1944–1945. IEEE, 1992.

J. F. MacGregor and D. T. Fogal. Closed–loop identification: the role of the noise model and prefilters. *J. Proc. Control*, 5(3):163–171, 1995.

Y. Maghsoodi. Design and computation of near–optimal stable observers for bilinear systems. *IEE Proceedings*, 136(3):127–132, May 1989.

S. Saxena, P. Mozumder and K. Taylor. Simulaneous control of multiple measures of nonuniformity using site models and monitor wafer control. *IEEE Transactions on Semiconductor Manufacturing*, 9(1):128–135, 1996.

C. Rao and J. Rawlings. Nonlinear moving horizon state estimation. *International Symposium on Nonlinear Model Predictive Control: Assessment and Future Directions*, 146–163, 1998.

D. C. Montgomery, J. B. Keats, G. C. Runger, and W. S. Messina. Integrating statistical process control and engineering process control. *Journal of Quality Technology*, 26(2), Apr. 1994.

K. R. Muske and J. B. Rawlings. Model predictive control with linear models. *AIChE Journal*, 39(2):262–287, 1993.

C. Pantelides. An advanced tool for process modeling, simulation and optimization. Presented at *Chemputers Europe III Conference*, 1996.

Z. Ning, J. R. Moyne, T. Smith, D. Boning, E. Del Castillo, J. Yeh, and A. Hurwitz. A comparative analysis of run–to–run control algorithms in the semiconductor manufacturing industry. In *Proceedings of the Advanced Semiconductor Manufacturing Conference*, pp. 375–381. IEEE/SEMI, 1996.

M. Nikolaou. Model predictive control and identification—An adaptive control paradigm. *TWMCC*, 2001.

B. Rincon and F. Prieto. A rule–based system used for sampling in a microelectronics production line, 2000.

M. Shouche, H. Genceli, P. Vuthandam, and M. Nikolaou. Simultaneous constrained model predictive control and identification of darx processes. *Automatica*, 34(12):1521–1530, 1998.

G. Stephanopoulos, O. Karsligil, and M. Dyer. Multi–scale aspects in model–predictive control. *Journal of Process Control*, 10:275–282, 2000.

S. W. Sung, I. Lee, and B. Lee. On–line process idenfitication and automatic tuning method for pid controllers. *Chemical Engineering Science*, 53(10):1847–1859, May 1998.

N. Tali–Maamar, J. P. Babary, and D. Dochain. Influence of the sensor location on the practical ovservability of distributed parameter bioreactors. In *Proc. of the IEE Conference CONTROL '94*, pp. 255–260, 1994.

K. S. Tsakalis. Performance limitations of adaptive parameter estimation and system identification algorithms in the absence of excitation. *Automatica*, 32(4):549–560, 1996.

F. D. Vargas–Villamil and D. E. Rivera. Multilayer optimization and scheduling using model predictive control: application to reentrant semiconductor manufacturing lines. *Computers and Chemical Engineering*, 24:2009–2021, 2000.

B. E. Ydstie. Transient performance and robustness of direct adaptive control. *IEEE Trans. Autom. Control*, AC–37:1091–1105, 1992.

J. Yoneyama, J. L. Speyer, and C. H. Dillon. Robust adaptive control for linear systems and unknown parameters. *Automatica*, 33(10):1909–1916, 1997.

Yucai Zhu. Multivariable process identification for mpc: the asymptotic method and its applications. *Journal of Process Control*, 8(2):101–115, 1998.

W. Gao and D. Wu. On the method of global linearization and motion control of nonlinear mechanical systems. In *Proceedings of the 1992 International Conference on Industrial Electronics, Control, Instrumentation, and Automation*, 3:1476–1481, 1992.

International Search Report dated Aug. 6, 2003 (PCT/US 02/28872; TT5213–PCT).

* cited by examiner

KALMAN FILTER STATE ESTIMATION FOR A MANUFACTURING SYSTEM

Applicant claims under 35 U.S.C. §119(e) the earlier effective filing date of co-pending U.S. Provisional Application Serial No. 60/318,792, entitled "An Adaptive Run-To-Run Scheme For Simultaneous Control and Identification for Multiple Product and Process Environments," filed Sep. 13, 2001, in the name of Alexander J. Pasadyn, for all common subject matter.

BACKGROUND OF THE INVENTION

1. Field of the Invention

This invention relates generally to the field of semiconductor device manufacturing and, more particularly, to a Kalman filter state estimation technique for monitoring a manufacturing system.

2. Description of the Related Art

It is typical in semiconductor manufacturing to see many different products being made by using a variety of process conditions on the same pieces of equipment. Because of the nature of the process conditions and the high cost of materials, it is very difficult and often impossible to obtain measurements of key process variables while the process is operating. Product wafers are run in batches on processing tools using recipes, which specify the parameters necessary to run the tool such as pressure, temperature, and processing time. Measurements are made after processing steps are completed to determine if batches meet their specifications. Run-to-run control methods use the measurement data available at the end of each run to determine better recipe settings for subsequent batches. This task is made more difficult by the fact that measurements are often confounded by several different possible sources of variation.

The manufacture of semiconductor devices is characterized by expensive equipment and raw materials being used to create microscopic features in a batch processing environment. In this environment, batches of wafers are subjected to a series of unit operations with the ultimate goal being to create functional parts. Throughout the operations, extreme processing conditions and features with a critical dimension being constructed are recurring themes. These conditions ultimately mean that it is difficult (and in many cases impossible) to measure important quality variables in situ. Variables of interest are typically measured after a batch has been processed. Unfortunately, it is typically not possible to go back and perform an operation again to correct a misprocessed batch. Therefore, effective process control is needed to ensure that every run goes according to plan.

Run-to-run control in semiconductor manufacturing is a type of batch control, where a batch may be as small as one wafer or as large as several lots of wafers. The standard output of a run-to-run controller is a process recipe. This recipe defines the set points for "low-level" controllers built into the processing tool. In this way, the run-to-run controller supervises the tool controller by specifying required values for process variables such as temperature, pressure, flow, and process time. The tool controller handles the actuations necessary to maintain these variables at the requested values. A typical run-to-run control setup includes a feedback loop where adjustments are made to the recipe parameters based on batch properties measured after processing. Typically, the job of the run-to-run controller is to ensure that each batch hits its inline targets. Inline targets refer to measurements that are taken while the wafers have only completed some of their processing steps. The inline targets are designed to provide guidelines for having functional parts at the end of the manufacturing line.

Run-to-run controllers for discrete parts manufacture have several inherent complications. Unlike a continuous process, where plant outputs can be blended together to make particular products, each part that is produced must meet all of its quality or performance objectives to function correctly. As a result, aggressive control laws must be chosen because the manufacturing constraints do not allow a series of off-target batches while the controller approaches the target. When the system model is able to make accurate predictions, the controller can be quite aggressive. This is because the stability of the controller is tied to the ability of the model to match the behavior of the real system. A controller that is too aggressive in the presence of model error and other uncertainties can actually exhibit poor performance and may lead to instability. This situation may arise because a controller makes process decisions based on assumptions about how its input changes will affect the process. The qualitative effects of small input changes are often easily understood and predicted in terms of the underlying physics of the system. On the other hand, larger, more dramatic changes can upset the process by introducing dynamics more quickly than the process can handle. With better understanding of the process, changes can be made more quickly and effectively.

The most aggressive controller that can be used is a plant inverse, or deadbeat controller. This controller attempts to immediately reject any measured incoming disturbances and set the controlled parameters for each batch exactly at their targets. The parameters may be determined by substituting the desired outputs into the process model and solving directly for the inputs. More conservative control actions can be obtained by imposing limits on how quickly input variables are allowed to change.

Because the process gain and other variables important to the manufacturing processes can change over time, a successful controller must adapt to changing process conditions. At the foundation of such an adaptive controller are system identification techniques. System identification techniques aim to determine a model with the same input-output characteristics and possibly the same natural model structure as the physical system under study. In many practical applications, it is not feasible to obtain an exact model form for the process under study. So, online system identification often takes the form of a parameter estimation problem. In this formulation, a form for the model is predetermined, and the model parameters are updated recursively from process data. Changing process conditions can be seen as a change in the estimated model parameters over time.

In microelectronics manufacturing, it is standard practice to apply statistical process control (SPC) techniques to the process outputs. SPC can also be applied to the outputs of a system under automated control. These outputs include not only the controlled outputs of the process but also the measured deviation of the real process from the prediction used by the controller. In general, the use of SPC techniques involves setting limits on the variables of interest and investigating the process when it strays outside the limits. As its name implies, statistical process control is heavily rooted in treating the process variables of interest as distributions. Several different statistics can be monitored to ensure that the process remains stationary. These techniques are designed to indicate whether a process is running in control or not, but decisions about what to do when the process goes out of control are left to engineers.

These SPC techniques can represent how well an automated controller is doing in terms of keeping the process running inside the control limits. When the limits are exceeded, either the process or the automatic controller must be adjusted. However, real processes and the disturbances to them change over time, so it is not necessarily true that all process variables of interest will remain stationary. In addition, there are many systems where all of the measurements important to control cannot be taken as frequently as desired. For these systems, it is possible that some measurements that would be outliers are not identified simply because they are not measured. In this context, static limits on process variables do not always make sense. The ideal solution is an automatic controller that can detect process changes and adjust itself to account for them. Such an automatic controller could adjust the process before the control limits on the quality outputs are even violated. This controller must recognize that the model it uses may become invalid, so it must always treat new measurement data as an opportunity to remodel the process.

To achieve adequate performance in an uncertain environment, the control system must react to process changes. Adaptive control techniques are a class of control schemes where the controller automatically adjusts its model parameters and tuning to account for observed changes in the process itself. These techniques often rely on online model parameter estimation, and the controller settings are continually adjusted to match the current system model derived from the measurements. Adaptive control is useful when the true model of the system is complicated or of high order, since the control law can be based on a simpler model with adjustable parameters. These controllers can be obtained from a variety of design methods including pole placement techniques and minimization of quadratic cost functions. Adaptive control techniques can enable advanced control concepts such as optimal control to be used in cases where the system under study is very complicated or poorly understood.

For a given system with manipulated inputs and a quantitative performance objective, optimal control theory can be used to find the best set of inputs. The optimal control problem is to determine the set of inputs that minimize (or maximize) an objective function while satisfying the constraints of the system model and any additional process requirements. Mathematically, this is described by the equations below, where x represents the process state, u represents the manipulated input, t represents time, f is the objective function, and $g_i$ are a series of constraints on the solution.

$$\min_u f(x, u, t) \quad (1)$$

$$g_i(x,u,t) \geq 0 \quad (2)$$

For certain types of systems, this works well for solving the control problem. One advantage of optimal control is that the control objective is clearly defined. Evaluating the objective function at the solution provides a quantitative measure of the expected performance of the controller. When paired with adaptive techniques, optimal control can meet the control objectives even when the system changes over time. The optimal control equations are very general, and are not limited to describing simple systems. The constraint equations, $g_i$, normally include differential equations or difference equations that govern the process as well as operating limits that are imposed on the process inputs and states. For most real processes, the above problem often results in a set of nonlinear differential equations with mixed boundary conditions.

Optimal solutions have been derived for some simple process models. One class of such problems is a linear (L) model and quadratic (Q) objective function with additive Gaussian (G) noise in the model, also called the LQG problem. For these systems, the optimal controller can be derived. In general, approximations must be made for real processes, and a sub-optimal controller must be used. This is because the true model of the system is often either unknown or too complicated for the optimal controller to have a closed form solution. A common approach is to formulate the problem as LQG and to use the corresponding linear controller.

One method used in adaptive control is a sub-optimal approach, where the process model is assumed to have a simple model form, but the values of the model parameters are undetermined or time-varying. In this formulation, the optimal control law for the chosen model form can be derived in terms of the unknown model parameters. Then, system identification techniques can be used to determine the values of the model parameters that best explain the observed system behavior.

In this case the controller has a model that is accurate in the vicinity of the current operating point. As the process moves to other operating points, the model parameters are updated, so that the controller can still function effectively. The key constraint is that the model must match the input-output behavior of the real process in the current region of interest. The presence of disturbances and dynamics that are not accounted for by the model can affect the stability of the controller. The controller must be able to respond intelligently to errors in the parameter estimates as well as actual changes in the process that require changes in the model parameters. An adaptive controller recursively estimates the model parameters after each sample, and the control action is then calculated using the new values of the parameter estimates.

There are different approaches to adaptive control. The procedure described above is an indirect method, where the control action is computed based on estimated model parameter values. In the direct adaptive control method, parameters in the control law itself (such as gains) are computed recursively from the measured errors. The optimal adaptive controller tries to solve a dual control problem using a formulation having as a goal the simultaneous control and identification of the process. A sufficiently advanced controller takes into account the need to characterize the process and "probes" the process to obtain better parameter estimates.

The adaptive controller relies on system identification techniques to bridge the gap between the chosen model form and the actual model used for control by choosing appropriate values for all the parameters in the model from. System identification techniques fall into two main categories (i.e., offline and online) depending on whether or not they are performed in real time on data that are obtained while the system is operating.

Offline system identification schemes examine a complete set of process input and output data to arrive at a model. These schemes are very flexible because many different model forms can be tried, and they have the advantage of being able to analyze all of the process data at one time. Such a system can even use models such as artificial neural networks (ANN) that do not have prescribed structure. The main limitation of an offline system identification scheme is that it cannot predict how the model may change in the future.

Online system identification techniques are active as the process under study is running. They use process measurements and recursively update a system model of predetermined form. The estimator observes the system and adjusts the model parameters within the chosen model structure. In general, the estimator does not have a complete set of data with which to work. It only has access to the measurements that have already been made. However, an online system identification scheme has one distinct advantage over an offline method. The online method can quickly react to changes in the process. Process changes appear as errors in the values of the model parameters. If the process change is gradual over time, the online system identification method can adjust the model as the process changes, so the prediction error is kept low.

The common exponentially weighted moving average (EWMA) filtering technique can be used in recursive parameter estimation. Here, a new parameter estimate is obtained by using a weighted combination of a parameter estimate based on the current measurement and the current parameter estimate as shown in $$\tilde{x}_{k+1} = \lambda x_{k+1} + (1-\lambda)\tilde{x}_k, \quad (3)$$

where x is the measured value, and $\tilde{x}$ is the estimate.

The choice of the EWMA weighting parameter, $\lambda$, affects whether the estimator will respond slowly (for slowly drifting processes) or quickly (for processes undergoing a rapid change). So, different choices of the weighting parameter affect the stability of a controller using the parameter estimates under different circumstances.

To effectively estimate model parameters in an online recursive fashion, some process characteristics are required. Identification of a process under automatic control is complicated because the actions of the controller mask the underlying behavior of the process. In general, the inputs to the process have to vary in such a way that the model parameters can be uniquely identified. This requirement is called persistent excitation. A difficulty arises because the satisfaction of a typical control objective lowers the amount of excitation as the process reaches a steady state at the desired operating point.

Adaptive control techniques can be applied to batch processes for run-to-run control. The system model predicts the process behavior of each batch as well as how the system changes from batch to batch. The responsibility of the controller is to choose the optimal input settings for each batch. In a real manufacturing environment, process conditions are constantly changing, so the system models must be updated regularly. To arrive at the best inputs for each batch, the controller must react to the changing process conditions by adjusting the model parameters. This can be done by solving the system identification problem each time new data become available.

Run-to-run batch control in semiconductor manufacturing is often complicated by having multiple products and multiple processing tools. These situations arise very often in semiconductor manufacturing, but they are also an issue in other batch processing environments, such as the production of polymers. It is important that each batch meet its required specifications, but it is difficult to choose appropriate recipe settings when switching between different products and tools. Online system identification and adaptive control can help make this problem much more manageable. Of course, the success of the controller is dependent on the properties of the disturbances and system inputs as well as the controller design itself.

Consider a process that can be modeled linearly as a simple example, $$x = rt. \quad (4)$$

The extent of the reaction after time t is given by x, and r is the rate, which is known to fluctuate with changing process conditions. The target is a desired extent of reaction x*. After each run, a new estimate for the rate r is prepared based on the results of the run. In many applications, it is quickly observed that different products will have very different apparent reaction rates. However, the rate can drift from batch to batch, even if only one product is being made. This can be caused by reactor fouling, degradation of consumable materials, or process leaks.

Simply tracking an estimate for r from run to run is not acceptable because each switch to a different product appears as a step change. Each time the product switches, the rate estimate slowly moves to the new observed rate over the course of several runs. Reactor fouling causes the rate to continually decay over the course of the runs. An EWMA is used to filter the apparent rate data from each run, and the filtered values are used as the rate estimates. When a second product is run, the apparent rate is much different than what it was for the first product, and the filter causes the state estimate to slowly perceive this over time. The state estimate thus lags behind the observed value, especially when the products are switched. This difference between the estimate and the real state is what causes a controller using this estimate to miss the target.

Previous work in this area has led to the concept of observer scheduling. In this formulation, a model is developed for the tool state (x) that is independent of the product. This tool state is an intrinsic rate for the tool. A change in this rate affects all products that run on the tool.

$$x_{k+1} = Ax_k + Bu_k \quad (5)$$

The process state x is mapped to the product state y using the output equation $$y_k = Cx_k. \quad (6)$$

Then, the estimator is used to track the tool state x, rather than product state y. Inspection of the Kalman optimal filtering equations indicates that optimal observer gain is a function of the output mapping C. So, by using offline analysis, the repeatable product dependence can be quantified to arrive at a new model for the rate r, where $r_0$ is the "intrinsic rate" of the processing tool, and $k_p$ is a product-specific correction factor.

$$r = r_0 k_p. \quad (7)$$

The observer then estimates $r_0$ instead of r, by scaling the observed rate by the correct product-specific factor $k_p$. In a situation where the product specific factors are known exactly, the scheme described above works very well. Changes in the operation of the processing tool are observed regardless of which product is running. However, in a real manufacturing environment, several complications arise. For example, there can be several processing tools, new products appear, and experiments can be very expensive in terms of both raw materials and processing tool downtime. The impact here is that the product specific factors are not always known a priori, so it is not necessarily safe to assume $k_p$ (and hence C) are known values.

The method above observes a single parameter ($r_0$), but it is necessary to find a way to quickly obtain estimates for new values of $k_p$. In principle, this can be done by observing the rate at each run, and updating the model parameters accordingly. In practice, observability concerns arise. The result of each run is a measurement of the apparent rate r, which is confounded by both $r_0$ and $k_p$, so any estimation scheme must be able to use the information available to adjust all the parameters as necessary.

To estimate $r_0$ and $k_p$ from the data (r), the previous equation may be used with a Taylor series approximation, $$\Delta r = r_0 \times \Delta k_p + k_p \times \Delta r_0. \tag{8}$$

An apparent change in the value of r can be expressed as a change in the estimates of $r_0$ and $k_p$. So, it is necessary to classify the changes (using an analysis of variance technique) to determine how to distribute the error between the two parameters.

One simple method of distributing the error is to apply a linear filter to each parameter.

$$r_{0,new} = r_{0,meas}\lambda_r + r_{0,last}(1-\lambda_r) \tag{9}$$

$$k_{p,new} = k_{p,meas}\lambda_k + k_{p,last}(1-\lambda_k) \tag{10}$$

The lambda values are varied to reflect the confidence in the parameter estimates. In situations where $r_0$ is expected to be changing, $\lambda_r$ is high, and in situations where $k_p$ is thought to be in error, $\lambda_k$ is high.

As an example, for a well-established product, there is a high degree of confidence that $k_p$ is accurate. In addition, $r_0$ is known to drift over time. Thus, the relation $\lambda_r >> \lambda_r$ is used. On the other hand, for a new product, there is less confidence in the value of $k_p$. It is expected that an inaccurate $k_p$ will affect the rate more than the noise or drift in $r_0$, so the condition $\lambda_k >> \lambda_r$ is set.

This technique, while simple to understand, is limited because it is a rule-based scheme that relies on concepts that are difficult to quantify. Furthermore, it is not always possible to solve the model equations for each parameter in turn.

A successful controller for the types of processes described herein would be able to address the dual problems of simultaneous identification and control. It is easier to learn about the process by making large input changes or running non-production experiments, but this directly opposes the primary goal of the controller. Making the process choices involves a tradeoff between tightly tracking the targets and helping to characterize the process because the two objectives conflict with each other.

Run-to-run control as practiced in high-volume multi-product semiconductor manufacturing does not easily fit into the framework of traditional approaches to process control. A traditional approach defines a process model with a given set of states, inputs, and outputs. In some cases, the model is static, and in others, it changes over time. At each time step, inputs and disturbances affect the states, and outputs are measured. Then, the controller makes an update and the process repeats. One reason this approach is not always successful is that there are often multiple processing tools as well as multiple products. It is a common practice in today's microelectronics manufacturing facilities to have many different products and processes run on each processing tool, mainly because of the high capital costs associated with the tools and the limited capacity of the facility. In addition, of all the measurements important to a process, only a subset are generally made on each run. Determining how to do controller updates in this environment can be a challenging task.

A run-to-run controller relies on having a process model that is consistently correct from run to run. When the various processes run on the tool are significantly different, the controller may behave unexpectedly because a change to a new process can appear to be a large disturbance. In addition, it may take several successive runs of a given process for the controller to stabilize, but manufacturing constraints may prevent this from happening. In the best case, the controller would determine optimal settings for all processes that must run on the tool, regardless of the order in which they appear.

In an adaptive control strategy, an online system identification scheme runs along with the controller and constantly adjusts the model so that it mimics the true behavior of the system. One very difficult task in this situation is determining which of the many possibilities (parameters, bias estimates) is the source of the observed errors in the output. In semiconductor manufacturing, a common question is whether the errors are assignable to tool differences or to product differences.

The present invention is directed to overcoming, or at least reducing the effects of, one or more of the problems set forth above.

SUMMARY OF THE INVENTION

One aspect of the present invention is seen in a method for monitoring a manufacturing system. The method includes defining a plurality of observed states associated with the manufacturing system. State estimates are generated for the observed states. An uncertainty value is generated for each of the state estimates. Measurement data associated with an entity in the manufacturing system is received. The state estimates are updated based on the measurement data and the uncertainty values associated with the state estimates.

Another aspect of the present invention is seen in a system for monitoring a manufacturing system. The system includes a controller configured to define a plurality of observed states associated with the manufacturing system, generate state estimates for the observed states, generate an uncertainty value for each of the state estimates, receive measurement data associated with an entity in the manufacturing system, and update the state estimates based on the measurement data and the uncertainty values associated with the state estimates.

BRIEF DESCRIPTION OF THE DRAWINGS

The invention may be understood by reference to the following description taken in conjunction with the accompanying drawings, in which like reference numerals identify like elements, and in which.

Figure 1:
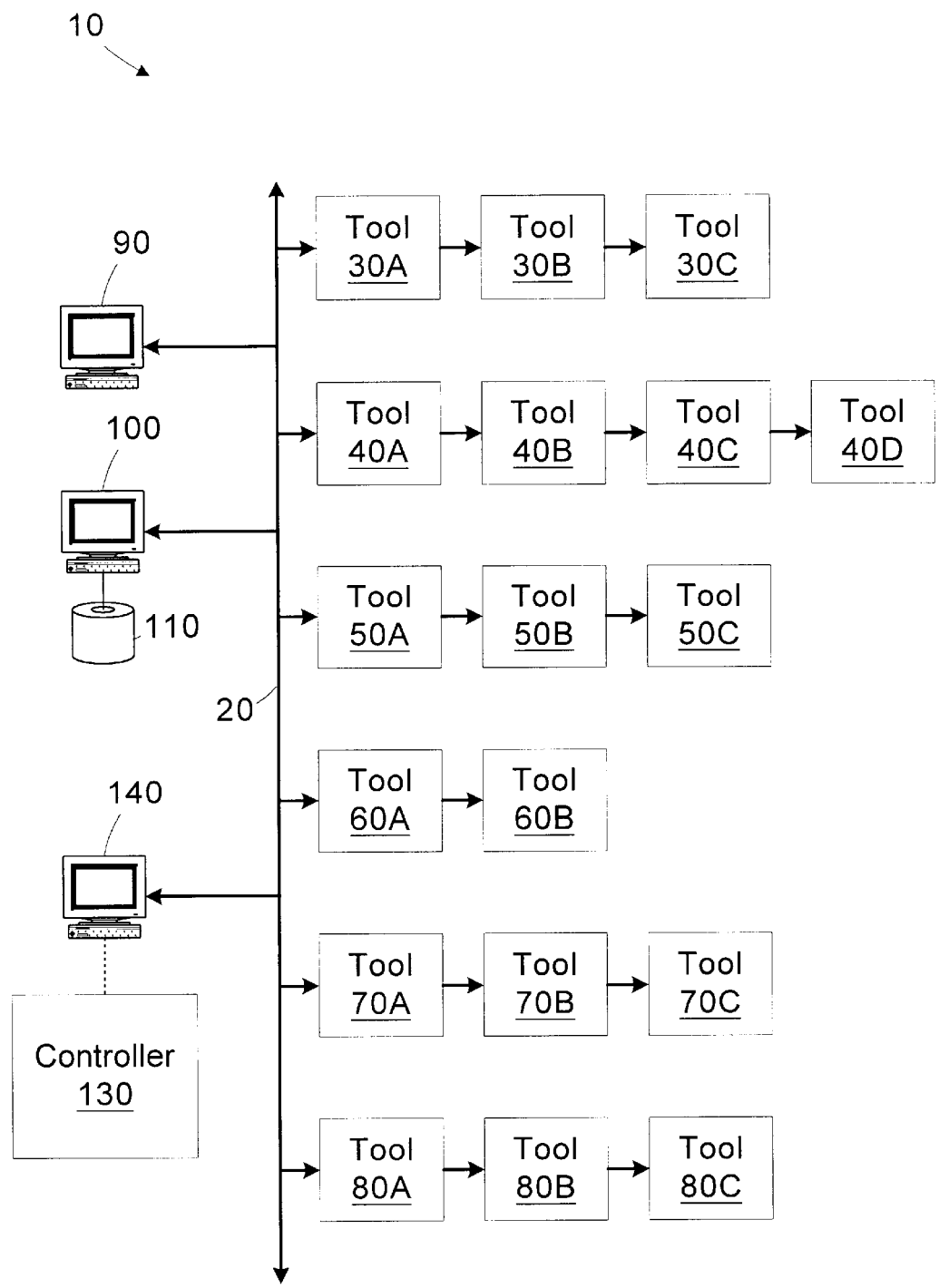
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items including, but not limited to microprocessors, memory devices, digital signal processors, application specific integrated circuits (ASICs), or other similar devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment, include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools may be arranged in any order or grouping. Additionally, the connections between the tools in a particular grouping are meant to represent only connections to the network 20, rather than interconnections between the tools.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The manufacturing system 10 also includes a controller 130 executing on a workstation 140. As described in greater detail below, the controller 130 determines operating recipe setting for various tools 30–80 in the manufacturing system 10. Abbreviations and symbol nomenclature used herein are summarized below in Appendix A.

The distribution of the processing and data storage functions amongst the different computers or workstations in FIG. 1 is generally conducted to provide independence and central information storage. Of course, different numbers of computers and different arrangements may be used.

Figure 2:
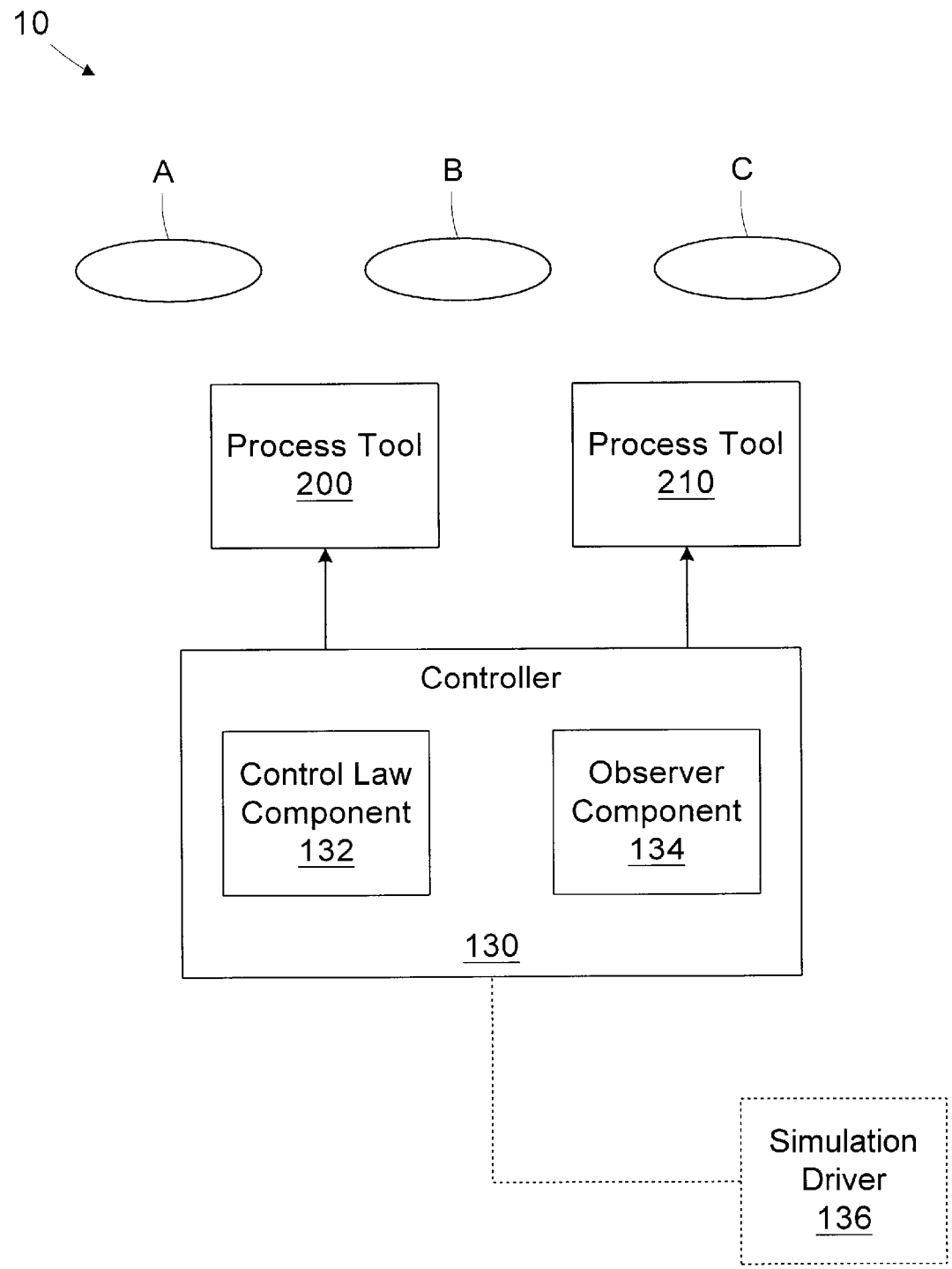
FIG. 2 is a simplified block diagram of a portion of the manufacturing system of FIG. 1.

Turning now to FIG. 2, a simplified block diagram of a portion of the manufacturing system 10 of FIG. 1 is provided. In the illustrated embodiment, the portion of the manufacturing system 10 includes first and second processing tools 200 and 210 interfacing with the controller 130 and configured to perform processes on three different products (A, B, and C). The number of tools 200, 210 and products is selected merely to facilitate the discussion. Of course, other number of tools 200, 210 and products may be used. The processes performed by the tools 200, 210 may be performed in any product/tool combination. The controller 130 includes a control law component 132, and an observer component 134. The observer component estimates and updates states of the manufacturing system 10. The control law component uses this state information to determine operating recipe parameters for the tools 200, 210.

Using a linearized form and assuming that there is a single "nominal" point for all combinations, the deviations from nominal removal for each context can be described by the equations $$y_{1A} = r_0 f_0 t + r_1 f_0 t_0 + r_0 f_A t_0 \tag{11}$$

$$y_{1B} = r_0 f_0 t + r_1 f_0 t_0 + r_0 f_B t_0 \tag{12}$$

$$y_{1C} = r_0 f_0 t + r_1 f_0 t_0 + r_0 f_C t_0 \tag{13}$$

$$y_{2A} = r_0 f_0 t + r_2 f_0 t_0 + r_0 f_A t_0 \tag{14}$$

$$y_{2B} = r_0 f_0 t + r_2 f_0 t_0 + r_0 f_B t_0 \tag{15}$$

$$y_{2C} = r_0 f_0 t + r_2 f_0 t_0 + r_0 f_C t_0, \tag{16}$$

where the subscript "1" refers to the process tool 200, and the subscript "2" refers to the process tool 210.

The entire system can be combined into a single state-space model, $$\begin{bmatrix} x_{adj} \\ r_1 \\ r_2 \\ f_A \\ f_B \\ f_C \end{bmatrix}_{k+1} = \begin{bmatrix} 0 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} x_{adj} \\ r_1 \\ r_2 \\ f_A \\ f_B \\ f_C \end{bmatrix}_k + \begin{bmatrix} r_0 \\ 0 \\ 0 \\ 0 \\ 0 \\ 0 \end{bmatrix}[t] \tag{17}$$

$$\begin{bmatrix} y_{1A} \\ y_{1B} \\ y_{1C} \\ y_{2A} \\ y_{2B} \\ y_{2C} \end{bmatrix}_k = \begin{bmatrix} 1 & f_0 t_0 & 0 & r_0 t_0 & 0 & 0 \\ 1 & f_0 t_0 & 0 & 0 & r_0 t_0 & 0 \\ 1 & f_0 t_0 & 0 & 0 & 0 & r_0 t_0 \\ 1 & 0 & f_0 t_0 & r_0 t_0 & 0 & 0 \\ 1 & 0 & f_0 t_0 & 0 & r_0 t_0 & 0 \\ 1 & 0 & f_0 t_0 & 0 & 0 & r_0 t_0 \end{bmatrix} \begin{bmatrix} x_{adj} \\ r_1 \\ r_2 \\ f_A \\ f_B \\ f_C \end{bmatrix}_k, \tag{18}$$

where the states consist of the adjustment ($x_{adj}$), tool biases ($r_1$ and $r_2$), and product biases ($f_A$, $f_B$, and $f_C$). This model is of a hypothetical situation where all product/tool combinations run simultaneously with the same input settings. Although this situation is unlikely to arise in practice, it is useful from the standpoint of understanding the interactions between the different processing contexts. It is clear, for instance, that the single product factor $f_A$ is used for all runs of product A, regardless of processing tool.

The observability test calculated here, $$O^T = \begin{bmatrix} 1 & f_0 t_0 & 0 & r_0 t_0 & 0 & 0 \\ 1 & f_0 t_0 & 0 & 0 & r_0 t_0 & 0 \\ 1 & f_0 t_0 & 0 & 0 & 0 & r_0 t_0 \\ 1 & 0 & f_0 t_0 & r_0 t_0 & 0 & 0 \\ 1 & 0 & f_0 t_0 & 0 & r_0 t_0 & 0 \\ 1 & 0 & f_0 t_0 & 0 & 0 & r_0 t_0 \\ 0 & f_0 t_0 & 0 & r_0 t_0 & 0 & 0 \\ 0 & f_0 t_0 & 0 & 0 & r_0 t_0 & 0 \\ 0 & f_0 t_0 & 0 & 0 & 0 & r_0 t_0 \\ 0 & 0 & f_0 t_0 & r_0 t_0 & 0 & 0 \\ 0 & 0 & f_0 t_0 & 0 & r_0 t_0 & 0 \\ 0 & 0 & f_0 t_0 & 0 & 0 & r_0 t_0 \end{bmatrix}, \tag{19}$$

is rank deficient by one, so the system is not observable in its current form. The reason for this situation is that all runs are confounded by both a product bias and a tool bias. An additional constraint would be needed to lock down one or the other. One method of adding additional measurements to the system involves the use of qualification experiments. During these events, standard tests are run on the equipment that can include the processing of specially prepared "reference" batches. As these tests are standardized across the group of tools, it is convenient to declare that there is no product-specific bias for these special runs. This means that the tool bias can be measured directly during the course of the test on a particular tool. When such experiments are not an option, it is also possible to simply select a reference tool or product that has a (known) nominal bias. The primary disadvantage of this method is that it may be difficult to identify a reference tool or product in a manufacturing environment that is constantly changing. The key here, though, is to find a way to make the system observable. The only ways to do this are to add needed outputs (measurements), add constraints (effectively reducing the number of states), or change the form of the model to something completely different.

In the example above, tool qualifications would appear as two new cases described by the following equations.

$$y_1 = r_1 \tag{20}$$

$$y_2 = r_2, \tag{21}$$

where $y_1$ and $y_2$ represent the deviations from nominal removal observed during qualification of tools 200 (i.e., 1) and 210 (i.e., 2), respectively. If the qualification experiments are added to the example system, then the new output equation for the combined system is $$\begin{bmatrix} y_{1A} \\ y_{1B} \\ y_{1C} \\ y_{2A} \\ y_{2B} \\ y_{2C} \\ y_1 \\ y_2 \end{bmatrix}_k = \begin{bmatrix} 1 & f_0 t_0 & 0 & r_0 t_0 & 0 & 0 \\ 1 & f_0 t_0 & 0 & 0 & r_0 t_0 & 0 \\ 1 & f_0 t_0 & 0 & 0 & 0 & r_0 t_0 \\ 1 & 0 & f_0 t_0 & r_0 t_0 & 0 & 0 \\ 1 & 0 & f_0 t_0 & 0 & r_0 t_0 & 0 \\ 1 & 0 & f_0 t_0 & 0 & 0 & r_0 t_0 \\ 0 & 1 & 0 & 0 & 0 & 0 \\ 0 & 0 & 1 & 0 & 0 & 0 \end{bmatrix} \begin{bmatrix} x_{adj} \\ r_1 \\ r_2 \\ f_A \\ f_B \\ f_C \end{bmatrix}_k \tag{23}$$

The observability matrix for this new system is $$O^T = \begin{bmatrix} 1 & f_0 t_0 & 0 & r_0 t_0 & 0 & 0 \\ 1 & f_0 t_0 & 0 & 0 & r_0 t_0 & 0 \\ 1 & f_0 t_0 & 0 & 0 & 0 & r_0 t_0 \\ 1 & 0 & f_0 t_0 & r_0 t_0 & 0 & 0 \\ 1 & 0 & f_0 t_0 & 0 & r_0 t_0 & 0 \\ 1 & 0 & f_0 t_0 & 0 & 0 & r_0 t_0 \\ 0 & 1 & 0 & 0 & 0 & 0 \\ 0 & 0 & 1 & 0 & 0 & 0 \\ 0 & f_0 t_0 & 0 & r_0 t_0 & 0 & 0 \\ 0 & f_0 t_0 & 0 & 0 & r_0 t_0 & 0 \\ 0 & f_0 t_0 & 0 & 0 & 0 & r_0 t_0 \\ 0 & 0 & f_0 t_0 & r_0 t_0 & 0 & 0 \\ 0 & 0 & f_0 t_0 & 0 & r_0 t_0 & 0 \\ 0 & 0 & f_0 t_0 & 0 & 0 & r_0 t_0 \\ 0 & 1 & 0 & 0 & 0 & 0 \\ 0 & 0 & 1 & 0 & 0 & 0 \end{bmatrix} \quad (24)$$

is full rank, so this system is observable. However, the system here is still the fictional case where all possible runs can happen simultaneously. In practice, one run happens at a time. It is necessary to determine the appropriate way to update the model states after each run.

Structurally, this system resembles a real system where the different measurements are sampled at different frequencies. With such a system, the observability changes over time as different combinations of measurements are available. The underlying implicit requirement, though, is that the system be observable in the limiting case where all possible measurements are made at every time step.

As described above by the equations above, it is possible to have a discrete time system model where only a subset of the possible measurements are made at each time step. In such a system, it is necessary to make state updates whenever new measurements arrive, integrating as much information as possible from the new measurements into the state estimates. In general, prediction errors (deviations between the measured and predicted outputs) drive changes to the state estimates. In the illustrated embodiment, the primary case under investigation has a measurement that is affected by more than one state.

Conceptually, such a problem appears impossible to solve, because a single known measurement has to be used to update more than one unknown state. However, in the illustrated embodiment, the controller 130 uses additional available information to handle to state updates. As described in greater detail below, the observer component 134 maintains estimates for all the states as well as a measure of the certainty of those estimates and applies a statistical analysis to determine which states are most likely to be the cause of an observed error in the predicted measurement.

The discussion now focuses on the design of the observer component 134. A major benefit that results from the understanding of optimal control theory is the realization that the control actions may be separated from the learning about the system. This general principle enables intuitive possibilities for controller 130 tuning. For instance, the response of the control law component 132 can be made more sluggish without affecting the state estimation routine. The control law component 132 can use the best information about the state of the system 10 to make whatever decisions it needs. The following discussion focuses on the state estimation problem. Once this problem is solved, any type of control law may be used to take advantage of the state estimates.

The following discussion addresses the problem of performing state updates when not all measurements are taken at each time step. In addition to the control of a semiconductor manufacturing line, this kind of system also applies to a traditional chemical process where some variables are sampled more frequently than others. For example, a flow meter can be constantly producing flow rate measurements, but the compositional analysis might only be done every several hours.

It is necessary to determine the best guesses of the true values of the system states given only partial information. The first step is to ensure that the system is observable in the case where all of the possible measurements are taken at each time step, as described above.

The system states are generally unknown quantities that are affected by noise and disturbances in addition to the known effects captured in the system model. From the standpoint of analysis, each system state can be treated as a continuous random variable. For convenience in this description, it is assumed that each is normally distributed around its current estimate with some variance, $\sigma^2$.

Figure 3A:
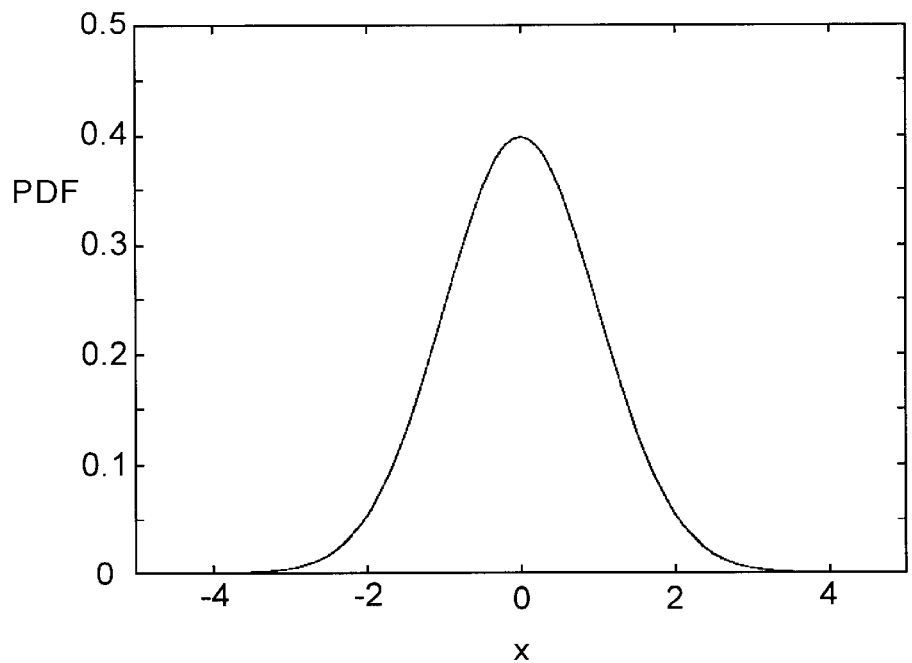
FIGS. 3A and 3B are graphs of exemplary probability density functions.

At the beginning of an estimation procedure, all of the variances are initialized to static values based on an experimental analysis of the process. The probability density function of each state is then given by $$f(x) = \frac{1}{\sqrt{2\pi}\sigma} \exp\left(-\frac{(x-\bar{x})^2}{2\sigma^2}\right), \quad (25)$$

where $\bar{x}$ is the mean and $\sigma^2$ is the variance. A plot of this function is shown in FIG. 3A.

For an n-vector of random variables, the probability density is given by $$f(x) = \frac{1}{\sqrt{(2\pi)^n \det V}} \exp\left(-\frac{1}{2}(x-\bar{x})^T V^{-1}(x-\bar{x})\right), \quad (26)$$

where $\bar{x}$ is the vector of means and V is the covariance matrix given by $$V = E((x-\bar{x})(x-\bar{x})^T). \quad (27)$$

Figure 3B:
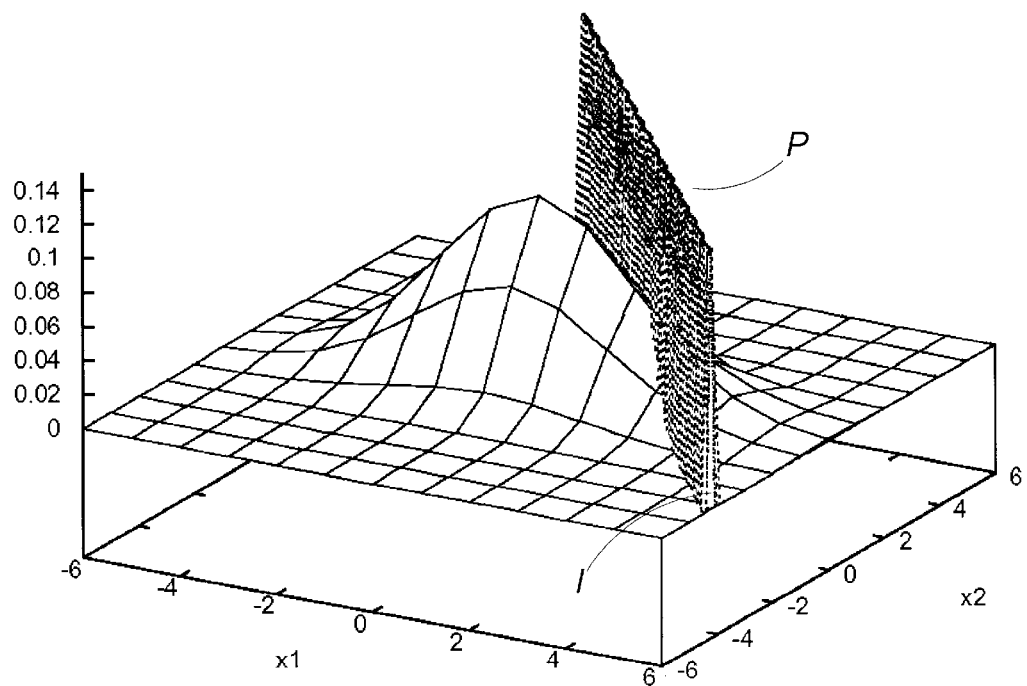

A plot of this multi-dimensional probability density function is shown in FIG. 3B. If there is nothing initially known about the interdependencies between the states, then V is simply a diagonal matrix of the variances of the state estimates.

The expected values of all the states are needed, given the measurements taken at a particular time step. The procedure will be described for a simple example case and then generalized. For this example, assume a system has two states described by $$x = \begin{bmatrix} x_1 \\ x_2 \end{bmatrix} \quad (28)$$

and an output equation given by $$y = Cx, \quad (29)$$

where $$C = \begin{bmatrix} a_1 & a_2 \\ b_1 & b_2 \end{bmatrix}. \quad (30)$$

At any given time step, $\hat{x}_1$ and $\hat{x}_2$ are the current estimates for the states, while $\sigma_1$ and $\sigma_2$ are the variances associates with those estimates. Assuming the states are independent and normally distributed around the estimates, then the probability density function is given by $$f(x) = \frac{1}{\sqrt{4\pi^2 \sigma_1 \sigma_2}} \exp\left(-\frac{(x_1 - \hat{x}_1)^2}{2\sigma_1^2} - \frac{(x_2 - \hat{x}_2)^2}{2\sigma_2^2}\right). \tag{31}$$

The output matrix contains two measurements, but if only one is obtained, it is still necessary to do a state update. According to the equations above, the predicted value for the first measurement is given by $$\tilde{y}_l = a_1 \hat{x}_1 + a_2 \hat{x}_2. \tag{32}$$

If a measurement of $y_{l,m}$ is obtained for $y_l$, then the prediction error is $$e_{y_l} = \tilde{y}_l - y_{l,m}. \tag{33}$$

The observer component 134 distributes this error between the states $x_1$ and $x_2$. This distribution can be accomplished since a line l implied by the measurement, $$y_{l,m} = a_1 x_1 + a_2 x_2, \tag{34}$$

is contained in the space where the probability density functions for the states are defined. The projection of the joint probability density function onto this line l provides an indication of the probability distribution after receiving the measurement. The line l may be visualized in FIG. 3B as the intersection between the plane, p, and the probability density function.

To compute the expected values of the states, let $(x_{1,0}, x_{2,0})$ represent the point on l closest to $(\hat{x}_1, \hat{x}_2)$. This point is chosen for convenience as it exists for any line l. The point is derived here as the solution to the following problem $$\min_{x1,x2}(x_1 - \hat{x}_1)^2 + (x_2 - \hat{x}_2)^2 \tag{35}$$

$$a_1 x_1 + a_2 x_2 = y_{l,m}. \tag{36}$$

If $a_2 \ne 0$, then $$-\frac{a_1 x_1}{a_2} + \frac{y_{l,m}}{a_2} = \hat{x}_2. \tag{37}$$

Substituting this into Equation 35 yields $$\min_{x1,x2}(x_1 - \hat{x}_1)^2 + \left(-\frac{a_1 x_1}{a_2} + \frac{y_{l,m}}{a_2} - \hat{x}_2\right)^2. \tag{38}$$

Setting the derivative with respect to $x_1$ to zero yields $$2(x_1 - \hat{x}_1) + 2\left(-\frac{a_1 x_1}{a_2} + \frac{y_{l,m}}{a_2} - \hat{x}_2\right)\frac{-a_1}{a_2} = 0. \tag{39}$$

Grouping the $x_1$ terms yields $$x_1\left(1 + \frac{a_1^2}{a_2^2}\right) - \hat{x}_1 - \frac{a_1 y_1}{a_2^2} + \frac{a_1 \hat{x}_2}{a_2} = 0. \tag{40}$$

Therefore, $$x_1 = \frac{\hat{x}_1 + \frac{a_1 y_1}{a_2^2} - \frac{a_1 \hat{x}_2}{a_2}}{1 + \frac{a_1^2}{a_2^2}} \cdot \frac{a_2^2}{a_2^2} = \frac{a_2^2 \hat{x}_1 + a_1 y_1 - a_1 a_2 \hat{x}_2}{a_1^2 + a_2^2}. \tag{41}$$

By symmetry, $$x_2 = \frac{a_1^2 \hat{x}_2 + a_2 y_1 - a_2 a_1 \hat{x}_1}{a_1^2 + a_2^2}. \tag{42}$$

So, $$(x_{1,0}, x_{2,0}) = \left(\frac{a_2^2 \hat{x}_1 + a_1 y_1 - a_1 a_2 \hat{x}_2}{a_1^2 + a_2^2}, \frac{a_1^2 \hat{x}_2 + a_2 y_1 - a_2 a_1 \hat{x}_1}{a_1^2 + a_2^2}\right) \tag{43}$$

The line, l, can be parameterized in t by $$x_1(t) = x_{1,0} + a_2 t \tag{44}$$

$$x_2(t) = x_{2,0} - a_1 t \tag{45}$$

Now, the unnormalized integral, $k_l$, of the probability density function along line l may be defined by $$k_l = \int_l \frac{1}{\sqrt{4\pi^2 \sigma_1 \sigma_2}} \exp\left(-\frac{(x_1 - \hat{x}_1)^2}{2\sigma_1^2} - \frac{(x_2 - \hat{x}_2)^2}{2\sigma_2^2}\right) dl, \text{ or} \tag{46}$$

$$k_l = \int_{-\infty}^{\infty} \frac{1}{\sqrt{4\pi^2 \sigma_1 \sigma_2}} \exp\left(-\frac{(x_1(t) - \hat{x}_1)^2}{2\sigma_1^2} - \frac{(x_2(t) - \hat{x}_2)^2}{2\sigma_2^2}\right) dt. \tag{47}$$

Then, the expected value of t is given by $$t_{exp} = \frac{1}{k_l}\int_{-\infty}^{\infty} \frac{1}{\sqrt{4\pi^2 \sigma_1 \sigma_2}} \exp\left(-\frac{(x_1(t) - \hat{x}_1)^2}{2\sigma_1^2} - \frac{(x_2(t) - \hat{x}_2)^2}{2\sigma_2^2}\right) dt, \tag{48}$$

and the expected values of the states are given by $$x_1 = x_{1,0} + a_2 t_{exp} \tag{49}$$

$$x_2 = x_{2,0} - a_1 t_{exp}. \tag{50}$$

Conceptually, the update will distribute the prediction error between the two states in a way that the change made to the state estimate is larger for a parameter with more uncertainty (variance). This is because the expected point on the line l is dominated by the parameter estimate with a "wider" probability density. This is illustrated graphically in FIG. 3B. The plane, p, cutting through the probability density function represents the information contained in a new measurement that is a function of both $x_1$ and $x_2$. The intersection of the plane, p, with the probability density function is the probability distribution given the new information.

The discussion above has a similar goal to a derivation of the discrete Kalman filter. It is desired to use uncertainty information to obtain better parameter estimates. There are multiple ways the Kalman filter can be derived. The formulation above treats the measurement information (l) as an absolute while in the Kalman filter derivation it carries uncertainty just as the state estimates do. Mathematically, the line l acts as a constraint above while in the Kalman filter formulation, it corresponds to a penalized term in an objective function that is being minimized. The Kalman filter approach to this problem will be outlined in greater detail herein as it is a much more general approach to the estimation problem.

Consider a system where $\bar{x}$ is the current vector of state estimates, P is the error covariance matrix for the state estimates, and y is a vector of measurements described by $$y = Cx + v, \tag{51}$$

where v represents random measurement error with zero mean and covariance matrix R.

Given the system described above, the discrete Kalman filter essentially minimizes the performance index $$J = \frac{1}{2}((x-\bar{x})^T P^{-1}(x-\bar{x}) + (y-Cx)^T R^{-1}(y-Cx)), \tag{52}$$

over x to arrive at the new state estimate vector.

This weighted least squares performance index minimizes the prediction error while penalizing changes to state estimates where the confidence in the current estimates is high. This is easy to see if the covariance matrix P is a diagonal matrix consisting only of the variances. A highly confident state estimate will have a low variance, so the corresponding element of $P^{-1}$ will be very large. In addition, if multiple measurements are received, they are weighted in the objective function in accordance with their confidence levels (as determined by the variance terms in the matrix R).

It is useful to note that when the terms of R are very small in magnitude, the new x must do a good job of explaining the measurement y, because the (y−Cx) terms are heavily penalized for large $R^{-1}$. If R is small, there is very little uncertainty in the measurement vector y. In the extreme case, the solution approaches the case where the state estimates end up on the line (or plane) defined by the measurements as in Equation 34. The optimization problem described in Equation 52 can be solved analytically by setting the differential dJ to zero.

$$dj = dx^T P^{-1}(x-\bar{x}) - (Cdx)^T R^{-1}(y-Cx). \tag{53}$$

Thus, $$0 = dx^T [P^{-1}(x-\bar{x}) - C^T R^{-1}(y-Cx)]. \tag{54}$$

Since dx can vary arbitrarily, the term in brackets must be zero, and it is possible to solve for the optimal x algebraically.

$$0 = P^{-1}x - P^{-1}\bar{x} - C^T R^{-1}y + C^T R^{-1}Cx \tag{55}$$

$$0 = (P^{-1} + C^T R^{-1}C)x - P^{-1}\bar{x} - C^T R^{-1}y \tag{56}$$

$$(P^{-1} + C^T R^{-1}C)x = P^{-1}\bar{x} + C^T R^{-1}y + C^T R^{-1}\bar{x} - C^T R^{-1}\bar{x} \tag{57}$$

$$(P^{-1} + C^T R^{-1}C)x = (P^{-1} + C^T R^{-1}C)\bar{x} + C^T R^{-1}y - C^T R^{-1}C\bar{x} \tag{58}$$

$$x = \bar{x} + (P^{-1} + C^T R^{-1}C)^{-1} C^T R^{-1}(y - C\bar{x}). \tag{59}$$

In the two-variable case described above, $$C = [a_1 \, a_2] \tag{60}$$

and $$P = \begin{bmatrix} \sigma_1^2 & 0 \\ 0 & \sigma_2^2 \end{bmatrix}. \tag{61}$$

Since there is only one measurement, the matrix R is simply the single term R. So for this case $$X = \bar{X} + \left( \begin{bmatrix} \frac{1}{\sigma_1^2} & 0 \\ 0 & \frac{1}{\sigma_2^2} \end{bmatrix} + \begin{bmatrix} a_1 \\ a_2 \end{bmatrix} \begin{bmatrix} \frac{1}{R} \end{bmatrix} [a_1 \, a_2] \right)^{-1} \begin{bmatrix} a_1 \\ a_2 \end{bmatrix} \begin{bmatrix} \frac{1}{R} \end{bmatrix} [y - C\bar{x}]. \tag{62}$$

Equation 62 can be further simplified by $$x = \bar{x} + \begin{bmatrix} \frac{\sigma_1^2 a_1^2 + R}{\sigma_1^2 R} & \frac{a_1 a_2}{R} \\ \frac{a_1 a_2}{R} & \frac{\sigma_2^2 a_2^2 + R}{\sigma_2^2 R} \end{bmatrix}^{-1} \begin{bmatrix} a_1 \\ a_2 \end{bmatrix} \begin{bmatrix} \frac{1}{R} \end{bmatrix} [y - C\bar{x}] \tag{63}$$

$$x = \bar{x} + \frac{\sigma_1^2 \sigma_2^2 R}{\sigma_1^2 a_1^2 + \sigma_2^2 a_2^2 + R} \begin{bmatrix} \frac{\sigma_2^2 a_2^2 + R}{\sigma_2^2 R} & -\frac{a_1 a_2}{R} \\ -\frac{a_1 a_2}{R} & \frac{\sigma_1^2 a_1^2 + R}{\sigma_1^2 R} \end{bmatrix} \begin{bmatrix} a_1 \\ a_2 \end{bmatrix} \begin{bmatrix} \frac{1}{R} \end{bmatrix} [y - C\bar{x}] \tag{64}$$

$$x = \bar{x} + \frac{\sigma_1^2 \sigma_2^2 R}{\sigma_1^2 a_1^2 + \sigma_2^2 a_2^2 + R} \begin{bmatrix} \frac{a_1}{\sigma_2^2 R} \\ \frac{a_2}{\sigma_1^2 R} \end{bmatrix} [y - C\bar{x}] \tag{65}$$

$$x = \bar{x} + \frac{1}{\sigma_1^2 a_1^2 + \sigma_2^2 a_2^2 + R} \begin{bmatrix} a_1 \sigma_1^2 \\ a_2 \sigma_2^2 \end{bmatrix} [y - C\bar{x}]. \tag{66}$$

This result demonstrates how the uncertainties in the state estimates and the measurement affect the update.

In the case where only a subset of the measurements are obtained, y, R, and C in Equation 52 are replaced by the reduced versions. Here $y_r$ is the vector of measurements obtained, $C_r$ contains the rows in C that give the measurements obtained, and $R_r$ is the covariance matrix for this reduced set of measurements. In this situation, the state update is given by $$x = \bar{x} + (P^{-1} + C_r^T R_r^{-1} C_r)^{-1} C_r^T R_r^{-1}(y_r - C_r \bar{x}). \tag{67}$$

As different measurements are taken, the effective C and R matrices change. Since the effective output matrix is not constant, the variance estimates (and hence the effective update weights) never reach a steady state, even when the controller 130 runs for many time steps. The observer component 134 is constantly changing its gain as the processing mix changes.

State and variance estimates are updated at two distinct times: at the processing time and when measurement information arrives. The update at the processing time is a predictive update using the known model of the system. In this case, the model error is assumed to have zero mean and known covariance. The current state and variance estimates are both passed through the state transition matrix to arrive at new estimates. The update at the measurement step (the innovation) takes into account the new information learned from the measurements by solving the problem stated in Equation 52.

The evolution of x in time is given by $$x_{k+1} = A_k x_k + B_k u_k + G_k w_k \quad (68)$$

where $u_k$ is the process input and $w_k$ is a random process error with zero mean and covariance matrix Q. As above, the measurement taken is given by $$y_k = C_k x_k + v_k, \quad (69)$$

where v represents random measurement error with zero mean and covariance matrix R.

Any time the process is run, the state estimates and error covariance are updated using the following equations:

$$x_{new} = A x_{old} + Bu \quad (70)$$

$$P_{new} = A P_{old} A^T + GQG^T \quad (71)$$

These equations update the estimate for x assuming there is no noise, but the uncertainty contained in P increases. Any time a measurement is taken, the state estimates and error covariance are updated using these equations:

$$x_{new} = x_{old} + (P_{old}^{-1} + C^T R^{-1} C)^{-1} C^T R^{-1} (y - C x_{old}) \quad (72)$$

$$P_{new} = (P_{old}^{-1} + C^T R^{-1} C)^{-1}. \quad (73)$$

These equations ensure that the new estimate of x reflects the measurement data, and the uncertainty contained in P decreases. It is useful to note that the measurement update changes the off-diagonal terms in the error covariance matrix. These terms retain a memory of how states are related to each other based on past measurements.

So after each time step, the error covariance matrix is updated along with the state estimates. In general, a processing step increases the uncertainty (variance) while an additional measurement decreases the uncertainty. The fact that different combinations of measurements are made leads to different patterns in the covariance matrix.

Nonlinear systems can be handled by using the matrix of partial derivatives of the model equations instead of the matrices A, B, and C. In general, the same analysis still applies, and the process model is linearized around the current operating point at each time step.

In the nonlinear case, the model equations are a more general relation between the current and future state values.

$$x_{k+1} = f(x_k, u_k) \quad (74)$$

$$y_k = h(x_k) \quad (75)$$

At a given time step, these equations can be linearized to create the corresponding terms from the linear model.

$$A \approx \begin{bmatrix} \frac{\partial f_1}{\partial x_1} & \frac{\partial f_1}{\partial x_2} & \cdots \\ \frac{\partial f_2}{\partial x_1} & \frac{\partial f_2}{\partial x_2} & \cdots \\ \vdots & \vdots & \ddots \end{bmatrix} \quad (76)$$

$$B \approx \begin{bmatrix} \frac{\partial f_1}{\partial u_1} & \frac{\partial f_1}{\partial u_2} & \cdots \\ \frac{\partial f_2}{\partial u_1} & \frac{\partial f_2}{\partial u_2} & \cdots \\ \vdots & \vdots & \ddots \end{bmatrix} \quad (77)$$

$$C \approx \begin{bmatrix} \frac{\partial h_1}{\partial x_1} & \frac{\partial h_1}{\partial x_2} & \cdots \\ \frac{\partial h_2}{\partial x_1} & \frac{\partial h_2}{\partial x_2} & \cdots \\ \vdots & \vdots & \ddots \end{bmatrix} \quad (78)$$

The following discussion outlines the use of an estimation algorithm based on the Kalman filter to be used in a run-to-run control situation with multiple processing contexts. The algorithm utilizes $\bar{x}_k$ and $\bar{P}_k$, the state estimate vector and the uncertainty information contained in the error covariance matrix. When it is time to compute settings for a particular run, the observer component 134 must first identify the states and measurements that apply to the run. Since the objective for the run is to achieve a particular value of the system output, the controller 130 must calculate the effective output mapping $C_r$ for the given context.

Given the correct output mapping and the current state estimates, the control law component 132 can compute the process inputs and allow the process to proceed. Also at this time, the observer component 134 computes estimates for the post-process states $\hat{x}_{k+1}$ and covariance $\hat{P}_{k+1}$ using the process model. Using the effective output matrix, the observer component 134 can also predict the output $\hat{y}_{k+1}$.

After the run, the observer component 134 receives a measurement $y_{k+1}$. The observer component 134 can use the current state and covariance estimates along with the new measurement to minimize Equation 52. This results in new values for $\hat{x}_{k+1}$ and $\hat{P}_{k+1}$. As new products or tools 200, 210 are added, their state estimates must be added to the states already being stored and updated.

Due to changing process conditions such as the addition of new products or tools 200, 210, it is possible for the number of states tracked by the observer component 134 to change. It is beneficial for these changes to disturb the controller 130 as little as possible. To achieve this minimized disturbance, the information about the new state is merged into the existing state vector and error covariance matrix. After choosing an appropriate initial guess for the state estimate, a new element is added to the state vector to track the new state. In addition, a new row and column are added to the error covariance matrix. These new elements in the covariance matrix can all be initialized with zero except the variance term, which should be set relatively high to indicate that the new state is not well characterized.

The tuning parameters include the estimated noise properties for the model uncertainty (the G and Q matrices in the system model equations) and measurements (the R matrix). Also, the initial guesses for new states and state estimate variances must be determined. By choosing a high initial guess for the uncertainty in a new state estimate, the observer component 134 will be forced to update it preferentially until it more closely matches the performance of the existing states.

The choice of the R matrix affects how quickly the estimation scheme responds to measurement data. Larger values lead to a more sluggish response. The choices for the G and Q matrices affect how quickly the relative uncertainties in the different model states increase with processing. These can be used to cause the estimation scheme to favor updating certain parameters more than others.

The optimal tuning and even the model form depend heavily on process conditions. There is no perfect controller, but rather only a best controller for a given set of process conditions. A good understanding of the expected disturbances leads to a design that performs well under those circumstances.

In the state estimation scheme described above, there are two times that the state and uncertainty estimates are changed. These are the prediction made at processing time and the update at measurement time. To function correctly, the state estimation algorithm maintains a complete history of all runs that have been processed including all known measurements relating to them. In a batch-oriented processing environment with measurements taken before and after processing, it is possible for measurements to be delayed or even skipped entirely. It is necessary to ensure that the state estimator correctly assembles the information it receives into an accurate processing history.

In principle, it is possible to retain a complete processing history for the system, containing the inputs and outputs for each processing run. Then, when a measurement arrives, it is simply inserted into the history at the appropriate point. All the current state estimates can be computed by starting with the original guesses and iterating through each time step in the history.

Such a method requires very large data storage capacity. However, it is not always necessary to store all this data to calculate the correct current state estimates. In a system with 100% metrology (all variables measured for every run), the results from all of the runs will eventually be measured. If a record for the run is created at the processing step, it can be updated with the measurement data when the information becomes available.

All of the complete (process and metrology data available) records starting from the beginning of the history table and continuing until the first unmeasured run can be collapsed into the running "initial guesses" for the table. This is accomplished by performing both the prediction update and measurement update for each record. Nothing can be processed without making a processing record, so there is no chance of acquiring a measurement that does not correspond to a process event still in the table. This reduces the history table down to only the period of time where there are still measurements missing.

In the case where the operating constraints do not allow every run to be measured, it is necessary to define an expiration time. Runs older than the expiration time that have not yet been measured are discarded with the assumption that they will never be measured. This allows the standard collapsing described above to go on even in the case of incomplete metrology. An unmeasured process run only has the predictive update done when it is collapsed.

The adjustments described above allow the controller to treat the measurement data as a continuous stream even though the data can really arrive late and sometimes not at all. The following example shows how the controller for a multiple tool and product process would handle a typical situation. In this case, it is assumed that the tool and product names are sufficient to determine which model states are affected in each run. Table 1 illustrates a list of process events for this case.

TABLE 1

Process Events: Case 1

| Event ID | Batch ID | Description | Controller Action |
|---|---|---|---|
| 1 | 1 | Run Product A on Tool 1 | Predict States |
| 2 | 1 | Measure | Update States |
| 3 | 2 | Run Product A on Tool 2 | Predict States |
| 4 | 2 | Measure | Update States |
| 5 | 3 | Run Product B on Tool 2 | Predict States |
| 6 | 3 | Measure | Update States |

TABLE 1-continued

Process Events: Case 1

| Event ID | Batch ID | Description | Controller Action |
|---|---|---|---|
| 7 | 4 | Run Product B on Tool 1 | Predict States |
| 8 | 4 | Measure | Update States |

If the process proceeds in the order described in Table 1, then no historical information needs to be saved at all. Each event can update the controller states in the normal way as described in the table. Here, the only data that must be saved are included in x*, which denotes the "running total" of the set of state and uncertainty estimates. The values for x* are updated with each event, and then the event data are discarded.

However, if the processing occurs as described in Table 2 below, then the observer component 134 must decide how to interpret each new piece of data. Handling the measurement events is not as simple as before because the measurement information is out of date. Clearly, the observer component 134 still needs to do a state update with each new measurement, but it cannot simply base new state values on the latest measurement because the new information refers to an operation that took place in the past. The solution is to save all the event information so that the complete history can be constructed as the information becomes available. Information is then discarded only when it is no longer needed.

TABLE 2

Process Events: Case 2

| Event ID | Batch ID | Description | Controller Action |
|---|---|---|---|
| 1 | 1 | Run Product A on Tool 1 | Predict States |
| 2 | 2 | Run Product A on Tool 2 | Predict States |
| 3 | 3 | Run Product B on Tool 2 | Predict States |
| 4 | 2 | Measure | Update States |
| 5 | 1 | Measure | Update States |
| 6 | 4 | Run Product B on Tool 1 | Predict States |
| 7 | 4 | Measure | Update States |

Let $x^0$ denote the set of state and uncertainty estimates before any stored events are included. Then x* can be calculated by starting at $x^0$ and iterating over the stored events, applying the necessary updates.

For the first event in Table 2, there is no dependence on other information. Therefore, the state estimates can be predicted, and $x^0$ can be updated. In this case x* is equal to $x^0$, and the event data are discarded.

The next three events (2–4) in Table 2 are incomplete because the measurement steps for earlier batches have been skipped. In this case, $x^0$ remains constant, and the data for the three events are added to an internal history maintained by the observer component 134. This history is illustrated below in Table 3. Note that the event that is known to be missing is denoted with "N/A." Now, x* can be calculated by starting at $x^0$ and iterating over the three events in Table 3.

TABLE 3

Controller Internal History (Events 2–4)

| Event ID | Batch ID | Description | Controller Action |
|---|---|---|---|
| N/A | 1 | Measure | Update States |
| 2 | 2 | Run Product A on Tool 2 | Predict States |
| 4 | 2 | Measure | Update States |
| 3 | 3 | Run Product B on Tool 2 | Predict States |

When the next event (5) arrives, the observer component 134 has a complete set of data for all batches so far, so $x^0$ can be updated. Here the internal history contains the events listed in Table 4. The observer component 134 can update $x^0$ by iterating over these events. Then, the event data are safely discarded.

TABLE 4

Controller Internal History (Events 2–5)

| Event ID | Batch ID | Description | Controller Action |
|---|---|---|---|
| 5 | 1 | Measure | Update States |
| 2 | 2 | Run Product A on Tool 2 | Predict States |
| 4 | 2 | Measure | Update States |
| 3 | 3 | Run Product B on Tool 2 | Predict States |

The next two events (6–7) are incomplete because batch 3 was never measured. As before, the observer component 134 adds them to its internal history as shown in Table 5 and does not update $x^0$. As described above, it is possible to define an allowable time window for the data to arrive. If enough time passes, the observer component 134 can assume that the batch 3 measurement data will never arrive, and it can proceed by collapsing the data from events 6 and 7 into $x^0$.

TABLE 5

Controller Internal History (Events 6–7)

| Event ID | Batch ID | Description | Controller Action |
|---|---|---|---|
| N/A | 3 | Measure | Update States |
| 6 | 4 | Run Product B on Tool 1 | Predict States |
| 7 | 4 | Measure | Update States |

Based on the analysis above, each element in the measurement matrix is a random variable equal to a function of one or more of the states. Thus, it is possible to define a probability density function for the predicted values of the vector of measurements. If x has an error covariance matrix P, and the prediction of the output is given by Cx, then the covariance for the predicted output is given by $CPC^T$. This covariance matrix may be used to construct a probability density function for the predicted output using Equation 26.

Confidence intervals calculated for the predicted measurements can then be compared to specified operating limits to determine the processing and sampling requirements necessary to stay within the operating limits. This comparison gives the controller 130 a metric for estimating its own performance and potentially warning the user or even taking action to prevent a problem before it happens.

In this discussion, it has been shown that there is a statistical basis for using an uncertainty term to drive state estimate updates. The technique described updates states in a model even when direct measurements of them are not available. The discussion now presents simulation data for many different combinations of operating conditions as well as some comparisons to other control methods.

The state estimation scheme described above is designed to analyze large systems with several sources of variation using only portions of the desired data at any given time. The following discussion describes several simulations that illustrate how the state estimation scheme responds to different processing conditions. First, a base case is built to verify the controller 130 performance under nominal conditions. Then, complications are added sequentially to build up to more realistic operating conditions. The performance is also compared to a different controller (not shown) using the same challenge data.

In this section the initial testing environment is described, and some of the basic assumptions made in the remainder of the tests are justified based on the results obtained. To study the real effects of the changing process conditions, a simple run-to-run plant model is chosen. This plant model is a discrete-time model that evolves over the run number. The continuous-time effects that occur during processing of each batch are integrated to represent average characteristics of the batch as a whole. According to the plant model, the output is simply equal to the input plus the plant bias. The plant bias is not affected in any way by the chosen value of the input.

Since the following runs simulate the use of several different kinds of products and different processing tools, it is necessary to determine the sources of variation so that appropriate system states may be chosen. In a real application this involves a detailed analysis of available process data, but in this example, an assumption is made that the bias consists of a component from the processing tool as well one from the product being run.

In terms of the simulation, product refers not only to distinct products, but to the general class of features that make one run on a tool different from another. In other words, each product/layer combination in a real environment would be a different "product" in this simulation.

The process model for a particular tool and product can be written $$y = x_{t_i} + x_{p_j} + u,  \qquad (79)$$

where y is the output, $x_{t_i}$ and $x_{p_j}$ are the tool and product biases, and u is the chosen process input. The target is a particular value of y. For most of the simulations, a value of zero is chosen as the target. A further assumption is that tool qualification events are available and capable of measuring $x_{t_i}$ directly for every tool i. This assumption of qualification events results in the system being observable.

A traditional discrete time state space model is used, including the terms for process and metrology noise, $$x_{k+1} = A_k x_k + B_k u_k + G_k w_k, \qquad (80)$$

$$y_k = C_k x_k + v_k. \qquad (81)$$

So, for a system with m tools and n products, a state vector is constructed as $$x = [x_{adj}\ x_{t_1}\ x_{t_2} \ldots x_{t_m}\ x_{p_1}\ x_{p_2} \ldots x_{p_n}]^T \qquad (82)$$

where $x_{adj}$ is the adjustment state, and all tools and products are tracked with individual elements. The vectors w and v represent the process noise and measurement noise, respectively, and they are both assumed to be normally distributed with zero mean. The noise vectors are used in the control model so that assumptions can be made in the state estimation routines. In the simulations, other disturbances are added to the model in addition to the noise terms. These other disturbances affect the system by directly modifying the states in a way that the controller 130 cannot predict.

The state transition matrix is a square matrix of size m+n+1 and is given by $$A = \begin{bmatrix} 0 & 0 & 0 & \cdots & 0 \\ 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \end{bmatrix}, \quad (83)$$

which shows that all the tool and product parameters are nominally stationary. The process input is assumed to affect only $x_{adj}$, so it is of size m+n+1 by 1 with an effect given by $$B = [1 \; 0 \; \ldots \; 0]^T. \quad (84)$$

The complete output matrix (of size mn+m by m+n+1) for the process is given by $$C = \begin{bmatrix} 1 & 1 & 0 & \cdots & 0 & 1 & 0 & \cdots & 0 \\ 1 & 1 & 0 & \cdots & 0 & 0 & 1 & \cdots & 0 \\ \vdots & \vdots & \vdots & \ddots & \vdots & \vdots & \vdots & \ddots & \vdots \\ 1 & 1 & 0 & \cdots & 0 & 0 & 0 & \cdots & 1 \\ 1 & 0 & 1 & \cdots & 0 & 1 & 0 & \cdots & 0 \\ 1 & 0 & 1 & \cdots & 0 & 0 & 1 & \cdots & 0 \\ \vdots & \vdots & \vdots & \ddots & \vdots & \vdots & \vdots & \ddots & \vdots \\ 1 & 0 & 1 & \cdots & 0 & 0 & 0 & \cdots & 1 \\ \vdots & \vdots & \vdots & \vdots & \vdots & \vdots & \vdots & \vdots & \vdots \\ 1 & 0 & 0 & \cdots & 1 & 1 & 0 & \cdots & 0 \\ 1 & 0 & 0 & \cdots & 1 & 0 & 1 & \cdots & 0 \\ \vdots & \vdots & \vdots & \ddots & \vdots & \vdots & \vdots & \ddots & \vdots \\ 1 & 0 & 0 & \cdots & 1 & 0 & 0 & \cdots & 1 \\ 1 & 1 & 0 & \cdots & 0 & 0 & 0 & \cdots & 0 \\ 1 & 0 & 1 & \cdots & 0 & 0 & 0 & \cdots & 0 \\ \vdots & \vdots & \vdots & \ddots & \vdots & \vdots & \vdots & \ddots & \vdots \\ 1 & 0 & 0 & \cdots & 1 & 0 & 0 & \cdots & 0 \end{bmatrix}, \quad (85)$$

which results in an observable system. In each simulation run, only one row from the output matrix is active. This reduced subset of the output matrix is denoted by $C_{\mathit{eff}}$.

The simulations in this description employ three main components that are constrained to communicate only in certain ways. The primary component is the simulation driver 136, which is responsible for maintaining the "real" parameter values and calculating "measurements" based on control moves. Although, the simulation driver 136 is illustrated in FIG. 2, it would not normally be used in an actual implementation. It is depicted to aid in the understanding of the illustrations below. The control law component 132 is responsible for computing the settings to use for each run based on tool and product IDs provided by the simulation driver 136. The observer component 134 is responsible for updating the state estimates based on measurement information calculated by the simulation driver. This flexibility allows for a different model to be used for the plant than the controller 130 itself uses, but for ease of illustration, this capability is not used in these initial simulations.

In these initial tests, a plant with ten tools and ten different products is used. Each tool and product is assigned a unique bias, so there are twenty bias states in the model. In addition, each bias is assigned its own disturbance properties including noise and drift. The noise in each state is roughly an order of magnitude smaller than the average difference between the values of different states. A similar amount of noise is added to each measurement taken. A nominally stationary process is chosen to highlight the state estimation. As the states are not normally moving, the effects of disturbances are easier to visualize.

First, the process signal dataset is generated by choosing products and tools to run at random, with all tools and products having equal probability. This dataset is saved as a history of tool IDs, product IDs, and real states for each run. For each run in the simulation, the simulation driver sends the product and tool IDs, the target, and a unique ID for the particular run to the control law component 132. The control law component 132 returns the chosen process input and is responsible for maintaining its own set of information about each run. The simulation driver 136 then computes the process output based on the given input and the true states. This output is then passed to the observer component 134 of the controller 130 along with the unique ID for the run. The observer component 134 updates the state estimates for the controller 130 based on the supplied output data.

Since the focus of this discussion is on state estimation, a very simple control law is chosen for implementation by the control law component 132. The control law component 132 uses the state estimates for the current tool and product biases and uses a plant inversion to solve for the input that will place the output at the target. Of course, in an actual implementation, a variety of different control laws may be used. Using this control law, the deviation of the output from the target shows the error in the state estimates used.

The design of the observer component 134 contains many adjustable parameters that can be used for tuning. As described above, these parameters deal with the assumed noise properties of the system under study. In these simulations, a number of assumptions are made. First, all of the measurements are assumed to be equally reliable, so the variance estimate contained in the $R_{\mathit{eff}}$ matrix is always the same. In a real manufacturing facility, maintenance information from measurement tools and information about certain products may provide different values. The other assumptions deal with the process noise. The noise terms in the process model are constant throughout the simulation. The G and Q matrices are set so that the noises affecting the different states are not related, and tool states are noisier than product states. Again, in a real application, offline analysis must be used to determine these values. According to the model, the noise affects all the states, even the ones corresponding to tools and products that are not active for the current run.

These noise estimates are part of the model and are not related to the actual noise inserted into the simulations as they run. It is possible to manipulate the estimates to achieve different results. For example, if the observer is too sluggish, the process noise terms can be set higher. Since the parameters would then have more uncertainty, the observer component 134 would make larger adjustments to the state estimates.

Figure 4:
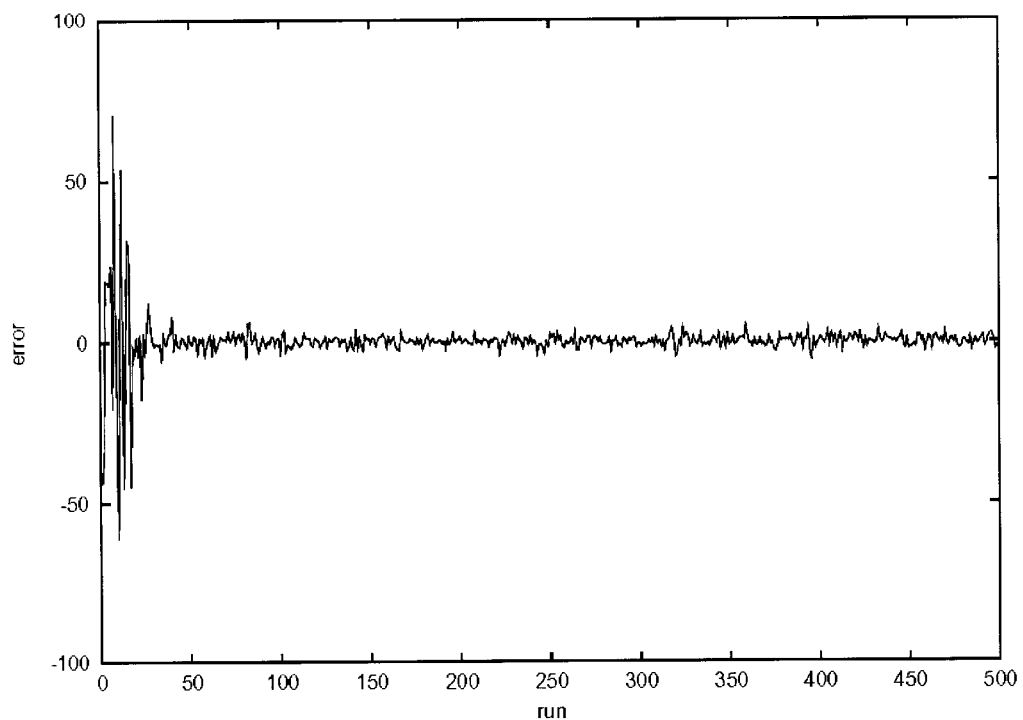
FIGS. 4 through 24 are graphs illustrating the performance of a controller of FIG. 1 to under various scenarios.

The first test for the controller 130 is to start with no information about the states of the system to be sure that it is able to bring the system under control. The real states contain noise and slight amounts of drift. FIG. 4 illustrates a plot of the output when the controller 130 is placed on a process with 10 tools and 10 products. The controller 130 has no prior information about the values of the states, and it is able to learn them quickly and bring the process under control.

The controller is initialized with all of its state estimates at zero. There is also an initial covariance matrix. Here, a diagonal matrix is used as the starting point with values chosen to represent the initial uncertainty in each of the states. Because product to product differences can be more dramatic than tool differences, the initial variance for the product states is set higher than that for tool states.

As shown in FIG. 4, the controller 130 negates the majority of the error after about 25 runs, and the controller 130 runs at a steady operating state after that. The steady noise level in the output is approximately equal to the magnitude of the noise being inserted into the process states by the simulation driver 136. The controller 130 begins with 20 unknown states, and it identifies them all reasonably well after about as many runs.

While it is important to be able to illustrate that the controller 130 can accomplish this task, it is not a case that is likely to appear in a real production environment. Offline analysis could be used to determine reasonable initial guesses for the controller 130 states. If a process is running with this combination of tools and products before a controller 130 is to be deployed, the observer component 134 of the controller 130 could be run on the production data to establish the correct state estimates before starting the controller 130.

Figure 5:
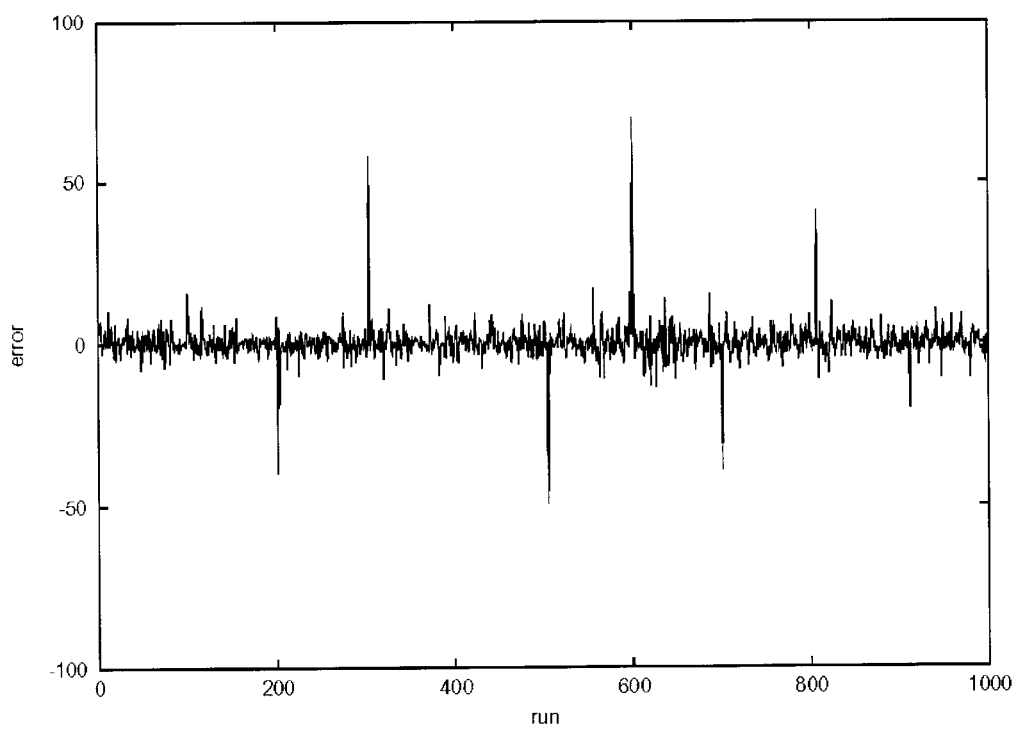

It is more common for new products to be introduced slowly over time, while existing ones gradually disappear. In this example, there are a total of 10 tools and 10 products, as in the previous case, but the rules for the simulation are different. All 10 tools are available at the start, but products are added slowly over time. Initially, only one product is available, but every 100 runs a new product is added to the mix. The response of the controller 130 is shown in FIG. 5, which shows a plot of the effective combined tool and product bias as 10 products are ramped up on 10 tools. For each run, the product to run and tool to use are selected at random from the available set. The plot of FIG. 5 is obtained by charting the output y when the input u is held at zero.

Each new product appears as a disturbance when it is first added, but the controller 130 quickly addresses disturbances. It is unlikely that entire batches of brand new products would be committed to production without any preparation in a real manufacturing environment. When a new product is introduced, in many cases, partial batches can be run to provide the controller 130 with the appropriate information. In other cases, an engineer may have enough knowledge to effectively choose a reasonable initial guess for the new state.

Intuitively, when a new product appears, there is a high probability that the initial state estimate is in error. For this reason, the state for the new product should be adjusted if indeed the controller 130 does not hit the target. In the control algorithm, this is accomplished by specifying an initial variance estimate for new states. When a new state is added, a new element with the initial state estimate is inserted into the state vector, and a new row and column are added to the error covariance matrix. In these simulations, the new row and column in the covariance matrix are all zeros except the diagonal element. This element is set to the initial variance estimate for the state. Specifying a higher value for this initial estimate means that the new state will absorb more of the error from the first run where the new state is used.

Subsequent test cases begin with stable systems and assuming that the controller 130 begins near the correct state values. In this manner, individual disturbances can be injected and analyzed without the observer component 134 having to do the initial state estimate learning again each time. In this section a series of standard disturbances are generated and used as the process signal for the controller 130. In each case, the system begins at a stable operating point, and the controller 130 has current state estimates. The ability of the controller 130 to respond to step disturbances, ramp disturbances, and target changes is tested first. Then, more difficult challenges such as measurement lag and missing measurements are illustrated to see the robustness of the controller 130 in the face of more realistic situations.

It should be noted that the disturbances under study here involve repeatable and systematic effects. In general, there are also random and unpredictable high-frequency components that appear as noise because they are not captured by elements of the chosen process model. The observer component 134 can only detect variations within the scope of the chosen model form, and the goal of the controller 130 is to eliminate them.

There are many events that can result in an apparent immediate shift in the performance of a tool. A step disturbance is a common signal used to test filters and controllers. Mathematically, the step disturbance is represented as a step function $$\delta_k(t)=0, \ t<k \tag{86}$$

$$\delta_k(t)=1, \ t \geq k \tag{87}$$

The simulation driver 136 adds a step disturbance to one of the tool states after 100 runs to ensure that the controller correctly rejects the unexpected disturbance. In a multiple processing setup such as this system, the step disturbance is not as straightforward as in a traditional process. In a simple system, a step disturbance remains visible from the time it appears until a correction is made. However, in the system under study here, the controller 130 observes combinations of different states at every time step. The disturbance only shows up occasionally because it is only visible when the perturbed state is used.

Figure 6:
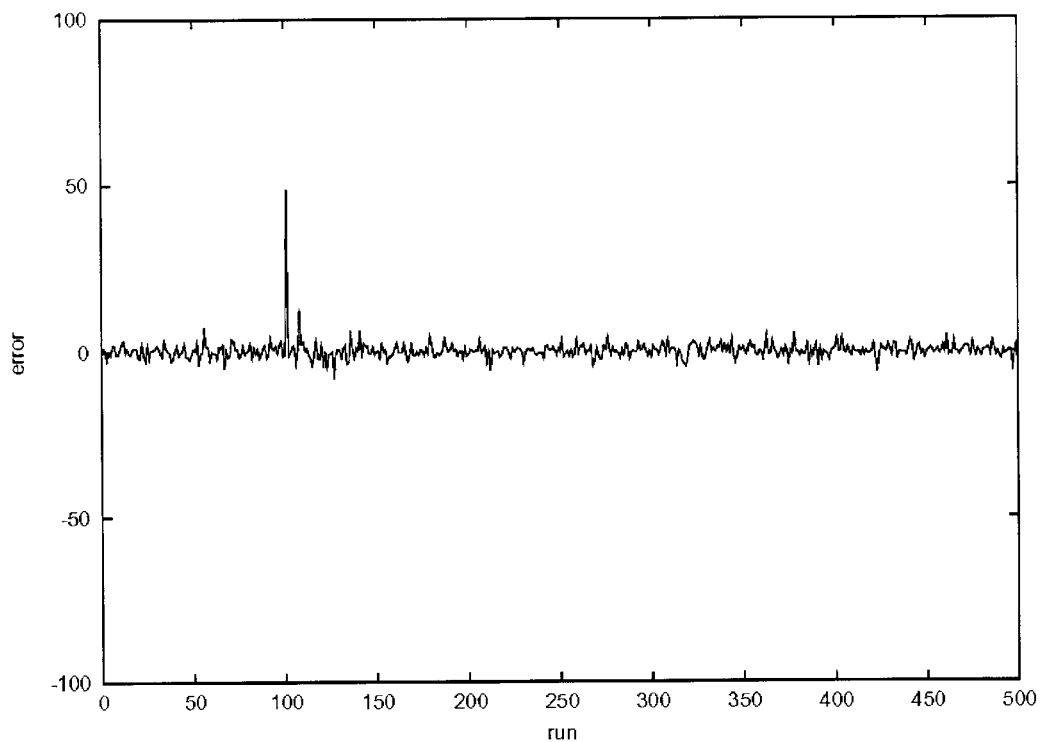

As shown in FIG. 6, the controller is able to compensate for the step disturbance at run 100. There is more than one "spike" on the graph is because the controller 130 has to determine whether the disturbance was in the product or the tool state, and a few runs pass before the suspect tool and product are used again. When the controller incorrectly predicts the results for a run, it is not immediately apparent which of the state estimates is in error. As described above, the observer component 134 uses the current estimates for the parameter uncertainties to assign the error to the parameters. Intuitively, to isolate the state that is in error, a subsequent run that shares either the tool state or the product state must be used. Each subsequent run exhibits the disturbance to a lesser degree.

The error covariance matrix that is present in a Kalman estimation scheme contains information about how the states are related. In this case, when the step disturbance first appears, the observer component 134 does not know whether the tool state or the product state used is in error. However, it distributes the error between the two states according to their relative uncertainties, meaning that one state estimate is partially moved incorrectly in the case of a disturbance to only a single state. However, the cross terms in the error covariance matrix relating the two states involved are also adjusted. This adjustment essentially provides information to the observer component 134 that it can use to repair the incorrectly moved state estimate once appropriate information becomes available.

This backfilling of information is a useful property of the observer component 134. As noted earlier, common state and parameter estimation schemes for multiple process environments are based on the partitioning of data. A characteristic of partitioned data is that one measurement only affects its own peers. Information from a new measurement of one parameter, for example, cannot be used to confirm or reject an observed signal in a different parameter. This combined estimation scheme can share data in this way, though, which means that fewer measurements are required to achieve proper state estimates.

Another example of the usefulness of this technique is in the use of qualification data. While many qualification events in a real plant are performed after tool maintenance or other discrete events, it is possible to use a qualification event to aid in state estimation. When a major disturbance is detected, the observer component 134 does indeed have to assign the error between different states. However, running a qualification test immediately on the affected tool can help minimize the impact of the disturbance on the controller 130. The qualification event is a direct measurement of the state associated with a particular processing tool. Intuitively, this will demonstrate whether the observed error was due to a tool issue or a product issue. Because the covariance matrix remembers what adjustments are made, after the tool state is measured, both the affected states will be moved to the correct values.

Figure 7:
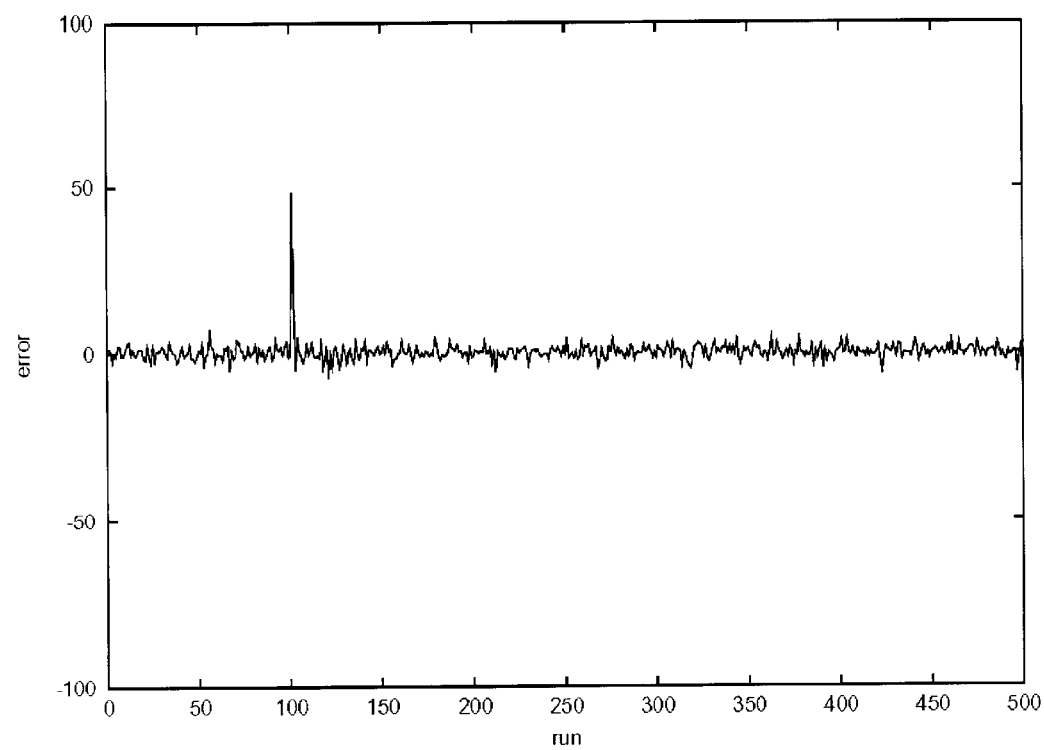

The simulation presented in FIG. 7 is identical to the one in FIG. 6 except that in this case a tool qualification is forced immediately after the disturbance is discovered. In this case the disturbance is rejected much sooner.

There are also many circumstances where a ramp, or continual drift may appear in the process. In this simulation, one of the tools is ramping between runs 100 and 400. To the controller 130, this type of disturbance appears as a persistent deviation from target, even as the states estimates are continuously updated. There has been a small amount of drift in all the simulations so far, but in this case, the magnitude of the drift is much larger.

Figure 8:
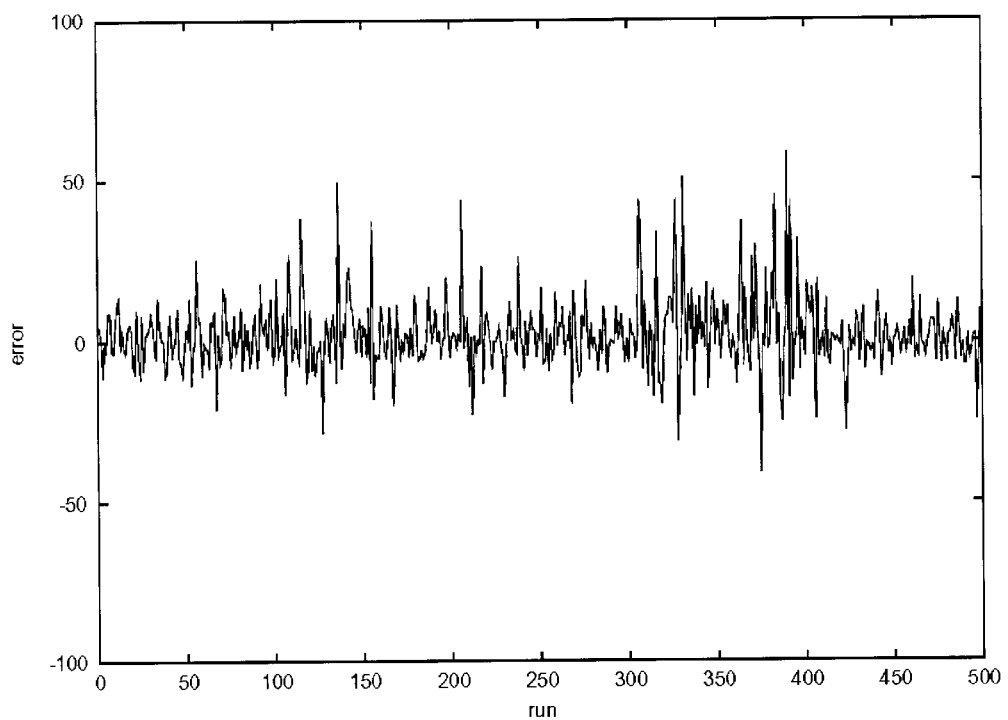

As shown in FIG. 8, the controller 130 is able to compensate for this disturbance to some extent. Generally, this is a difficult disturbance to reject, and overall controller performance is degraded during the length of the drift. Controllers can be specially tuned to reject this kind of disturbance by augmenting the state matrix so that the ramp disturbance is included in the model, but this causes a trade-off in the performance with other types of disturbances. This particular controller is much more suited to dealing with step disturbances. Ramp disturbances of the magnitude of the one in the simulation generally indicate a major tool problem and would most likely result in a shutdown.

In a real manufacturing environment, it is not always possible to wait for measurement results before running the next batch of product. The measurements can take considerable time because wafers must be picked up individually, and usually several sites are examined on each wafer destined for metrology. It is important to keep the processing tools busy, so they must go ahead and start running again as soon as possible after each batch finishes. Thus, the measurements can lag behind the processing steps by several runs. This is not a straightforward example of a time delayed process because the delay is not constant. Measurements arrive as they are finished, and the controller 130 needs to take them into account as soon as possible.

Figure 9:
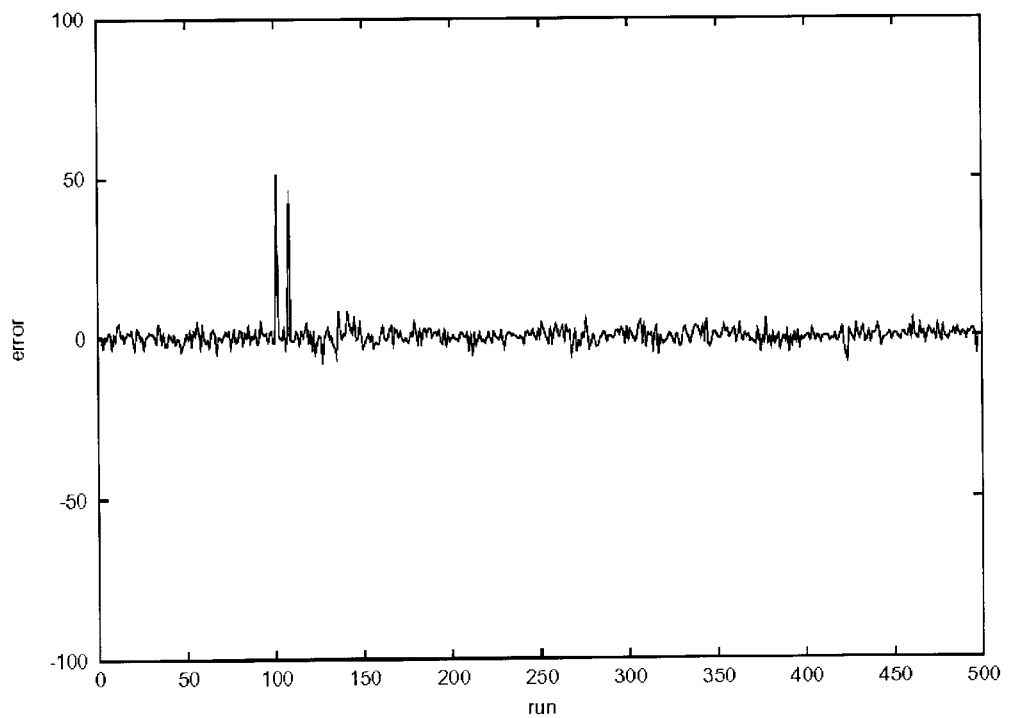
Figure 10:
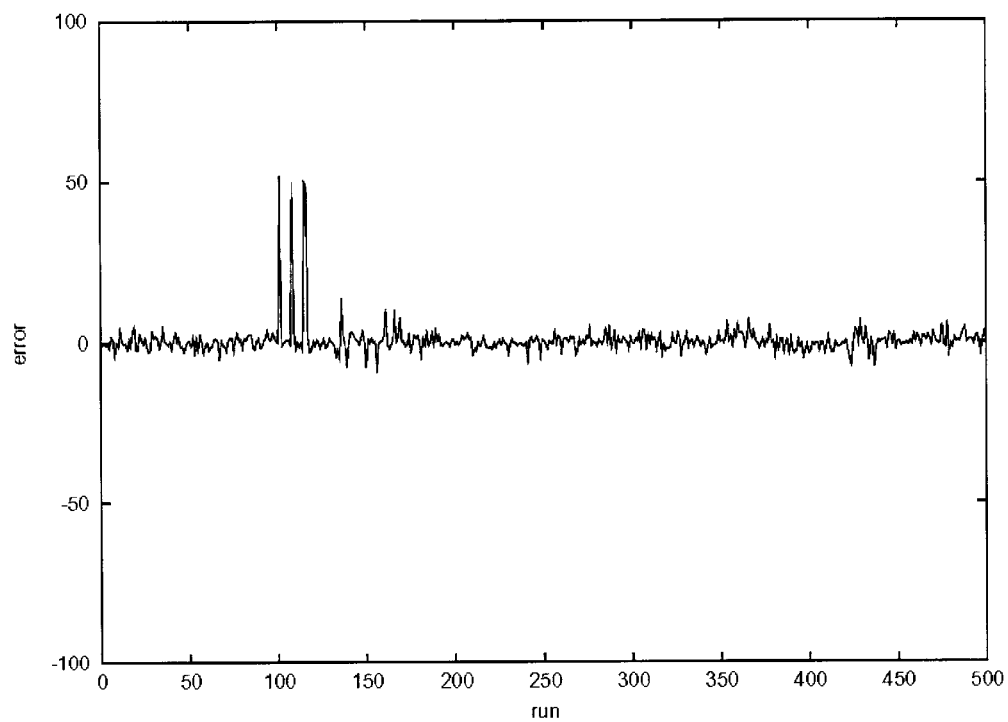

In this series of tests, the process datasets from the earlier tests are used again, but the measurements are not sent to the observer component 134 right away. Instead, the measurements constantly lag behind the processing by a fixed number of runs. The simulation depicted in FIG. 9 has a delay of 10 runs on the measurements, and the simulation depicted in FIG. 10 has a delay of 30 runs.

In these tests, the controller 130 is still able to reject the step disturbance, but the response is delayed because the error is not seen until the measurements arrive. Compared to the case without measurement delay, there are many more runs that miss their targets, and the test with the longer delay takes longer to settle after the disturbance. As with a traditional single-input/single-output process, if the measurement delay is too large, the controller 130 will be ineffective.

It is not always possible to measure the properties important to control on every batch at every processing step. This is a result of a number of factors. First, measuring wafers from a batch after a particular processing operation increases the time those wafers will be in the plant. The need for accurate characterization must be balanced with the need to move material through the line as quickly as possible. Only as much material as is needed to build a representative sample is measured. Also, the number of measurements that are to be taken in a given period of time determines the number of metrology tools that must be present in the plant. As the tools are normally very expensive, this is also a limiting constraint.

So, there can be runs where the controller 130 must compute the settings but never receives feedback from the measurement system. In the simulation environment, the impact of this situation can be measured because the simulation driver 136 can always determine what the missing measurements would have been and add them to the chart of the controller output. In these simulations, the step disturbance case from above is used, but the controller 130 only receives one third of the measurements.

Figure 11:
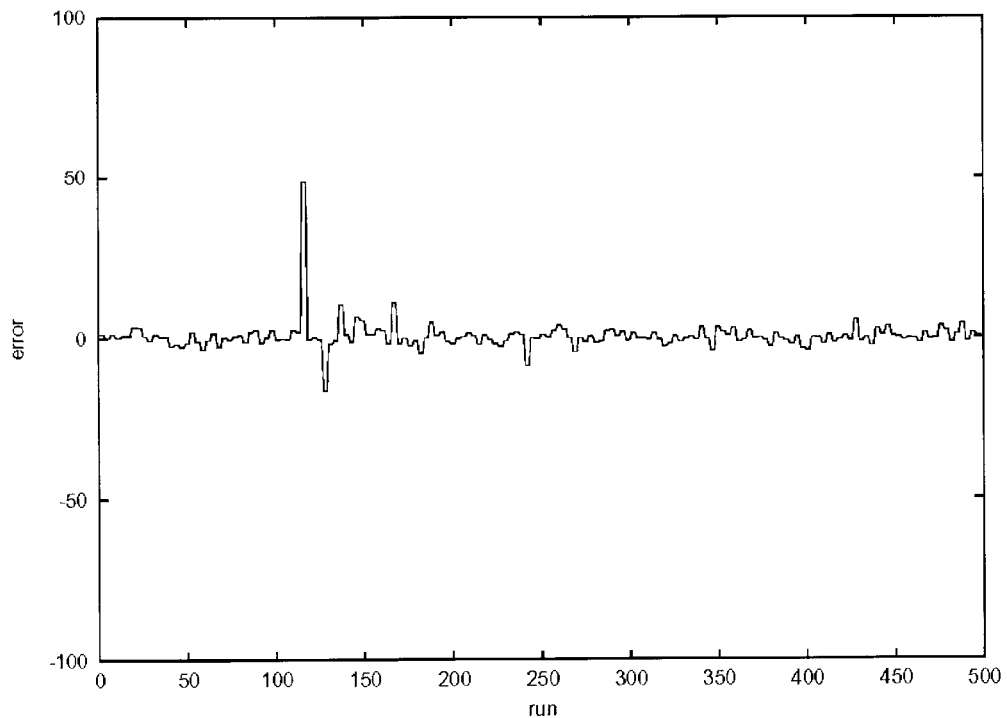
Figure 12:
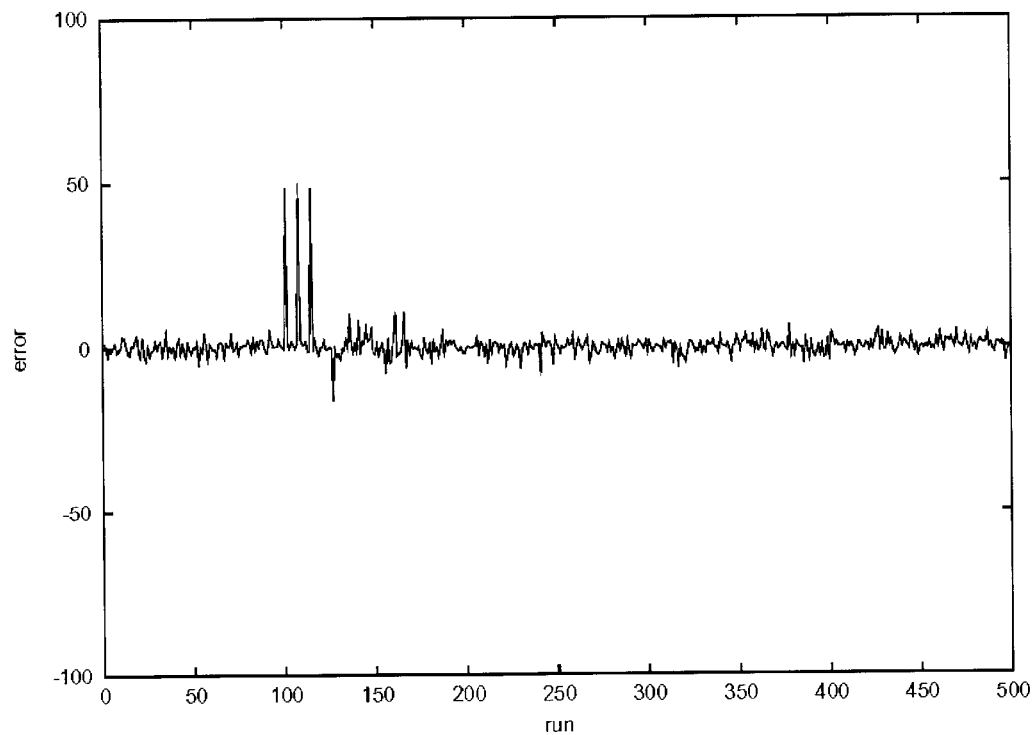
Figure 13:
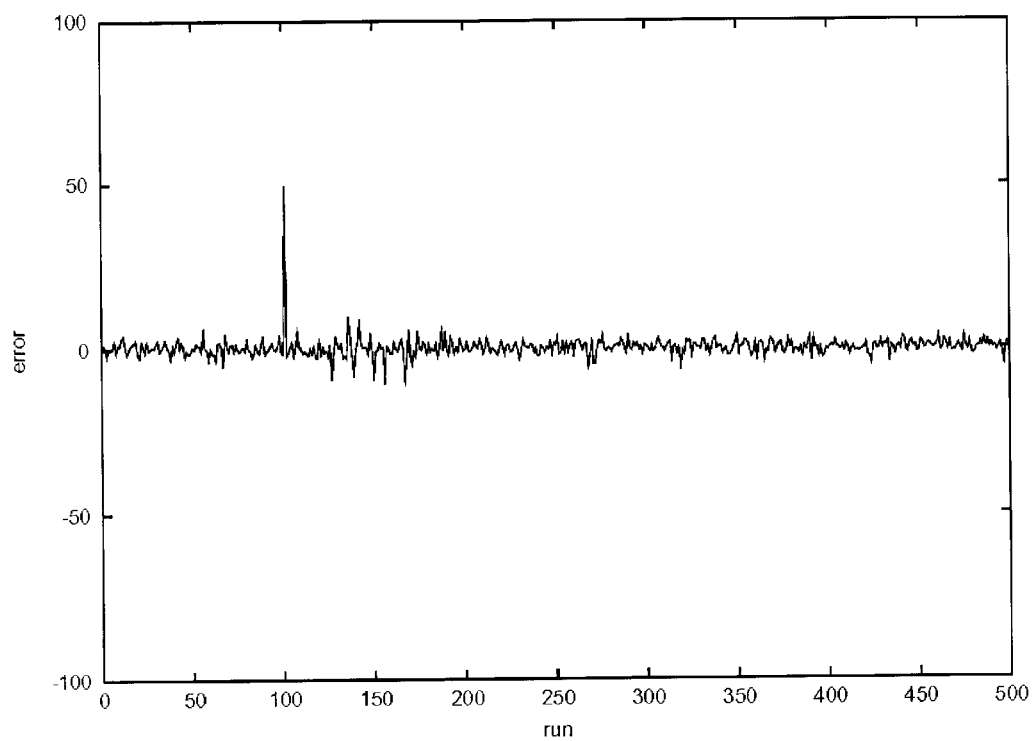

FIG. 11 shows how the output appears to the controller 130, while FIG. 12 shows the real outputs, including the batches the controller 130 did not get to see. The measurements visible to the controller 130 compare reasonably well with the complete measurements case depicted in FIG. 6. However, many of the unmeasured batches around the time of the step disturbance were away from the target. The fact that there are three spikes on the graph is coincidental and not related to the fact that one out of every three measurements were used. In this particular case, the third run affected by the disturbance was the first one measured. FIG. 13 illustrates the same case as the scenario of FIGS. 11 and 12, but with different measurements removed (i.e., a different third of the measurements were not received by the controller 130). As seen in FIG. 13, when different measurements are removed, the overall performance of the controller 130 changes.

Depending on process conditions, different variables may be easier or harder to observe. In the following section, a series of tests were run with a similar setup to the earlier ones, but with different processing rules and conditions. The scenarios in these tests attempt to impose realistic constraints on the operation of the process. Variables studied include plant size, product prioritization, and business operating rules.

Real manufacturing facilities have large numbers of tools and products. A values in the range of 20 tools and 50 products are reasonable values for a process area. The number of products can get very large because each process area contains batches at many different points in their process flow. Each layer being formed on a given product can behave just as differently as a different product as far as the state estimation algorithm is concerned. The simulation run here contains 10 tools and 50 products. The response of the controller 130 in this larger system to a step disturbance is plotted in FIG. 14.

Figure 14:
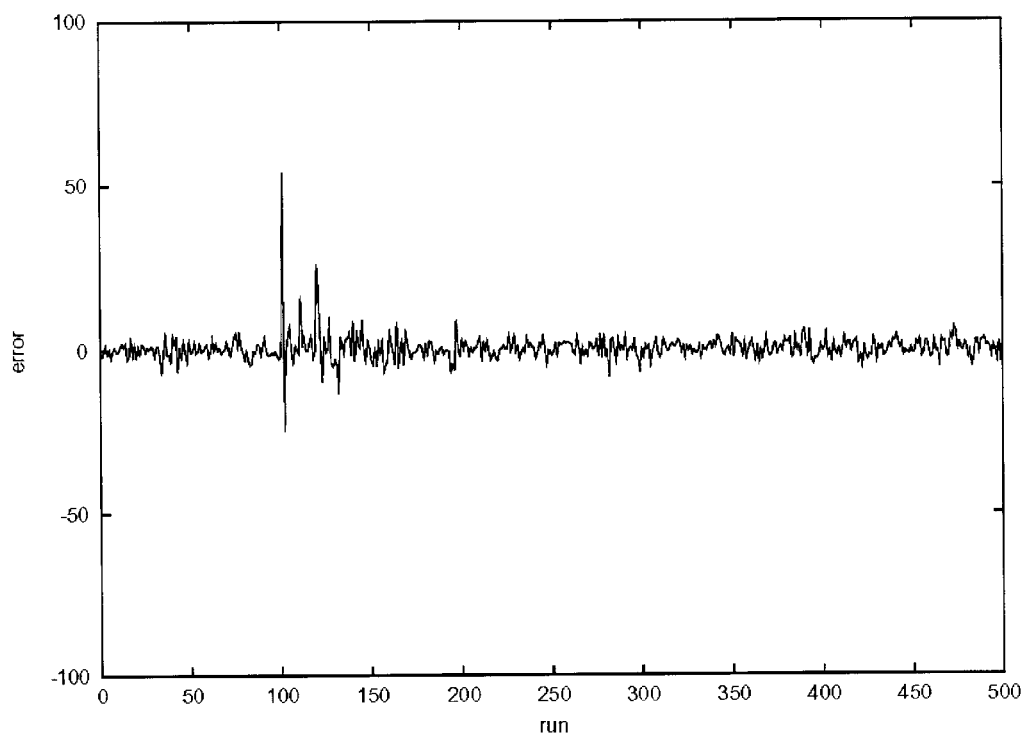

The plot of FIG. 14 is very similar to the plot for a 10×10 system shown in FIG. 6. The controller 130 is able to quickly identify the offending state and reject the disturbance. This result is important because it illustrates the ability of the state estimation routine to scale up to much larger systems.

One technique for addressing the problems associated with the large number of products and tools is to keep running specific products on specific tools for a long as possible before switching. This technique is commonly referred to as tool dedication, and is in fairly widespread use. In a situation where there are more tools than products, it reduces the control problem from a large multivariate problem to a number of simpler single variable problems. For each tool-product combination, only the combined state needs to be tracked, and no information is shared between contexts. Usually there are more products than tools, so tools are dedicated to long runs of particular products between switches.

However, tool dedication involves a trade-off. A tool dedication scheme reduces flexibility by limiting the potential tools where a given batch is allowed to run. When throughput of a particular product is a concern, tool dedication can cause unacceptable delays. Also, a problem occurs when a tool must be taken out of service (even temporarily). The products that run on the particular tool must be moved to other tools, and it is necessary to experiment to find the appropriate processing settings for the new combination.

The parameter estimation scheme described herein is affected by tool dedication, because dedicating causes certain combinations of tool and product states to be much more common than others. Intuitively, if a given product always runs on the same tool, it becomes more difficult to differentiate between errors in the state estimates for that tool and product. The next two simulations described use the 10 tool and 50 product step change datasets used above, but vary in the degree to which dedication is enforced.

Figure 15:
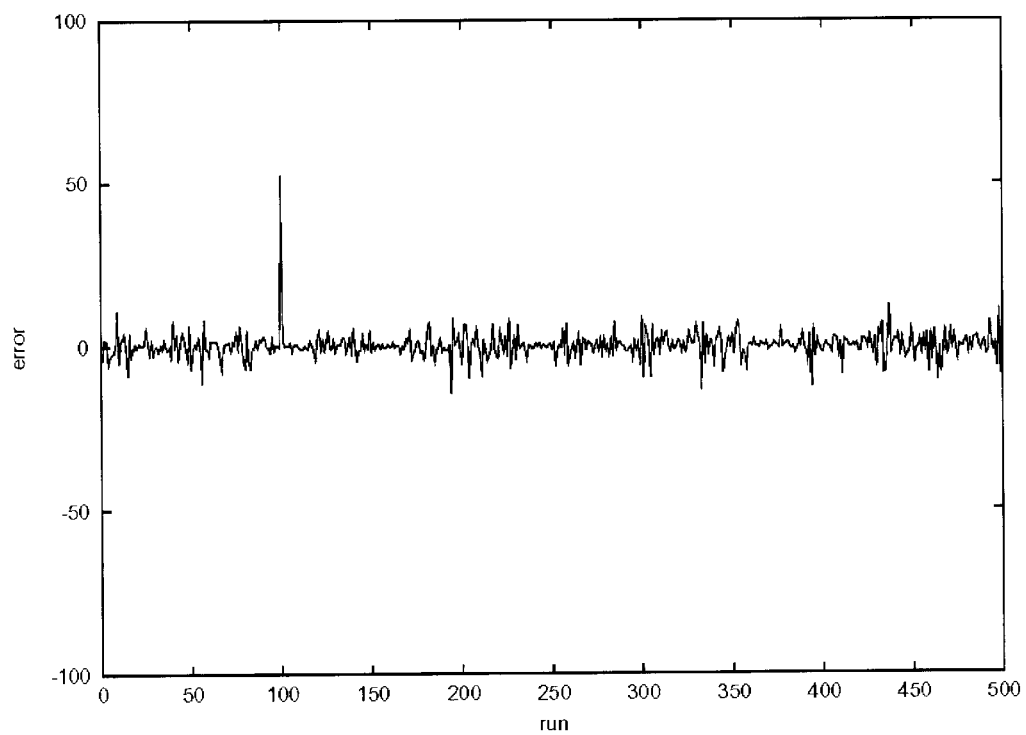
Figure 16:
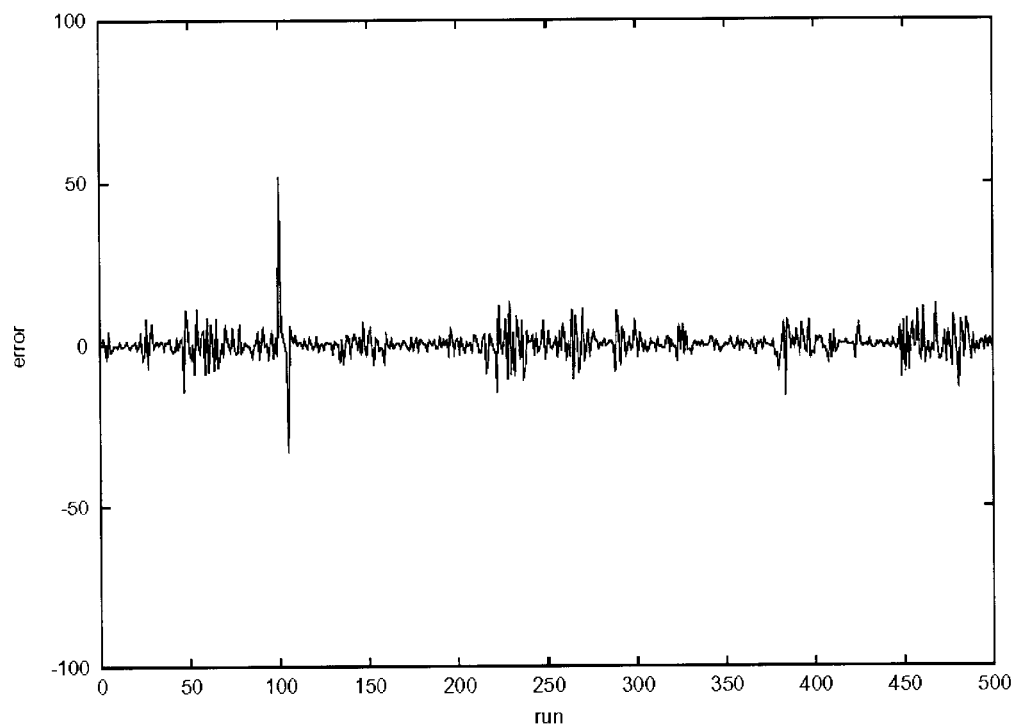

FIG. 15 illustrates the response when the controller 130 on a 10 tool and 50 product process reacts to an unanticipated step disturbance at run 100. During the simulation, short continuous runs of tool dedication are encouraged by only switching to a different tool 25% of the time. FIG. 16 illustrates the case where longer durations of tool dedication are encouraged (i.e., switching only 10% of the time).

The results of the simulations of FIGS. 15 and 16 show many spikes in the controlled output, and the spike with the longer runs of dedication is much more dramatic. Each of the spikes is caused by a switch to a different tool/product combination. By contrast, the step disturbance is rejected much more rapidly than in previous cases. The other useful thing to notice is that between the spikes, the noise level is lower than in the previous simulations. Ideally, the controller 130 would achieve this reduced noise level all the time, but this is a part of the unavoidable trade-off. As will be discussed in greater detail below, the system as defined in these tests is unobservable when dedication is in effect. During a run of dedication, the measurements that are taken are a combination of a tool state and a product state. The controller 130 has to adjust one or both whenever output errors are detected, and it has no way to determine which one is really in error. When it is time to switch, there is a high probability that at least one state estimate has a significant error. Thus, tool dedication is a trade-off where short term gains are accepted at the cost of having greater uncertainty when the inevitable switch occurs.

Figure 17:
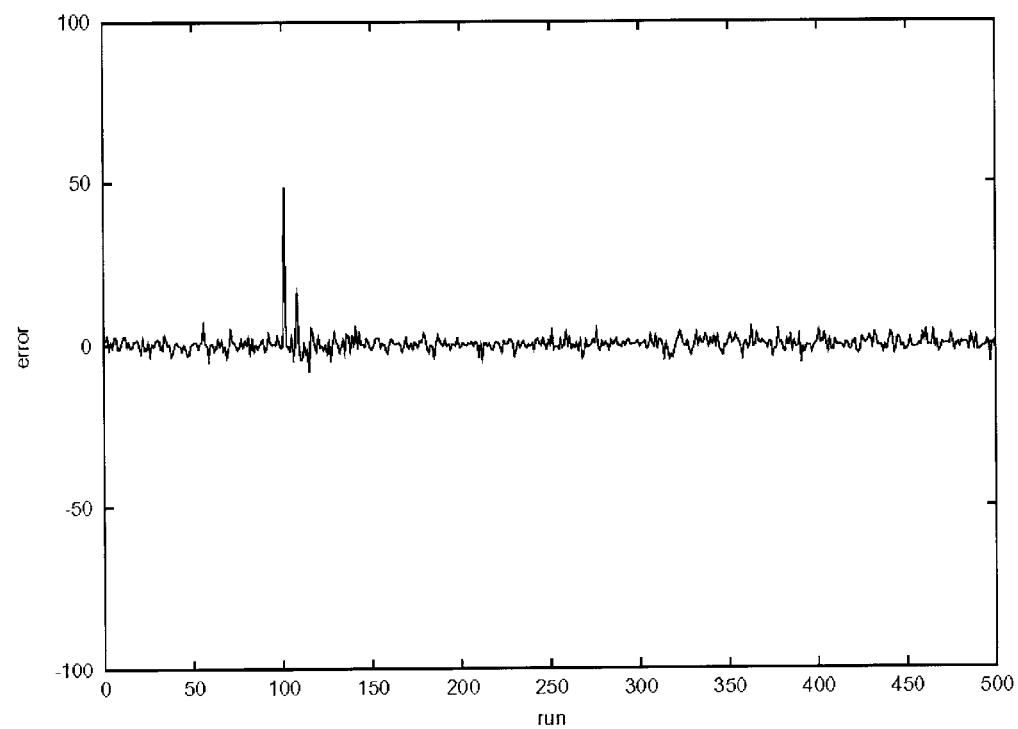

In the next scenario a typical manufacturing case is tested where one particular product appears much more frequently than the others. The goal of the scenario is to illustrate that the minor products are not "forgotten" during long runs of the major product. Furthermore, the major product should not be disturbed when switching back from the minor ones. During this 10 tool and 10 product simulation, over half the runs are of a single product. The other nine products are evenly distributed among the other runs. As in the previous simulations, a step disturbance affects one of the tools at run 100. As illustrated in FIG. 17, the controller 130 handles this scenario effectively.

From a robustness and stability standpoint, there are two main ideas to consider. Traditionally, the idea is to be sure that the control actions and state updates are not so aggressive that they respond to noise or outdated measurements in a way that causes the process to become unstable. This analysis is very dependent on the particular control law that is chosen and how well the model represents the true process. Because the manufacturing application requires a very aggressive control law, this discussion will focus on the stability of the state estimation itself and how well it tracks the true states.

In a traditional time-invariant observable process where the same measurements are made at each time step, the error covariance matrix used in a Kalman estimation scheme eventually reaches a steady state. At this steady state, the increases in uncertainty due to the noise inherent in the process exactly balance the reductions in uncertainty due to the measurements. As long as the model of the uncertainty in the process is fairly accurate, the diagonal terms of the covariance matrix provide steady state values for the uncertainties in each state estimate. This means that with the exception of unanticipated process disturbances the uncertainties in the controlled process outputs are known as well. Proper process characterization is important here because these results are only meaningful if the inherent process noise is well understood.

When the Kalman state estimator is used on a process where the output matrix varies, the error covariance matrix cannot reach a steady state. Each time the output matrix changes, relative uncertainties between different state estimates change. Even though a steady state cannot be achieved, it is still important to be able to bound the uncertainty in the parameter estimates. This allows the uncertainty in the controlled process outputs to remain bounded as well. Clearly, enough measurements must be taken to ensure that the parameter estimate uncertainty remains at an acceptable level. The next portion of the description details how this uncertainty changes with different types of processing conditions and measurements.

The system parameter estimation portion of an adaptive control method consists of a closed-loop system identification scheme. Closed-loop system identification can be difficult because the controller 130 can significantly change the apparent input-output behavior of the process. If the controller 130 is working well, the process is running near the target with very little variability. In this case, the dynamics of the system are difficult to observe.

A common approach used in closed-loop system identification is the use of a persistent excitation constraint. The general idea is to be sure that the process conditions are varied sufficiently to excite all the modes in the chosen model form. When the controller 130 is running a process at the target without any disturbances, there is very little movement in the process states, and the dynamics of the system are difficult (or sometimes impossible) to observe.

Persistent excitation injects small perturbations into the manipulated variables so that the dynamics become visible at the cost of small fluctuations around the process targets. It may also be possible to look at process inputs in the same way as a designed experiment. When designing an experiment to estimate model parameters, input points are chosen that attempt to examine all possible modes of the model form. If the process were to ever run with inputs that resemble the ones in the experiment, then it should be possible to prove that this results in the best possible estimates of the model parameters.

It is not straightforward to apply standard persistent excitation techniques to many of the process systems and models that are prevalent in a batch processing environment. In many cases, the state variable to be estimated is not directly affected by the commonly chosen input variables. A common example is a timed process, where the state to be estimated is a rate and the processing time is manipulated. Due to reactor fouling or consumable degradation, the chosen processing time can indeed have an effect on the processing rate for future runs. However, the time would have to be adjusted well outside the standard operating range for the rate differences to become noticeable.

There are processes where standard persistent excitation techniques can be used, but for many processes, a somewhat different approach must be used. Because of the high importance placed on every batch reaching its targets, a technique is explored for choosing times to excite the process while letting it run undisturbed at the target most of the time.

It is important to realize that not all data obtained in a manufacturing environment are the same. Some data are more informative because the quality of data is dependent on what is measured and the conditions under which the measurements are taken. The information content of data is dependent on what the observer is trying to learn from the data. For example, repeated measurements of temperature at a given pressure show clearly what the temperature is, but they do not provide any insight into what the temperature would be at a different pressure.

Based on a chosen model form, different input signals can highlight different modes and frequency ranges. As will be illustrated in the next section, it is necessary to have the right information at the right time to control a process well. Only an understanding of the process under consideration leads to the knowledge of exactly what information is required.

Standard tests for observability conditions can be used to compare different strategies for locating sensors from the standpoint of the information they can provide. Even when a system is observable, there are varying degrees of ease with which parameters can be estimated. The condition number of the observability matrix can provide insight into these effects. Techniques for testing observability are used herein to compare the estimation ability under different operating conditions.

A simple example illustrates the importance of good information when closed-loop identification is practiced in conjunction with process control. Consider a simple process where the output stays constant unless an input is applied. The objective is to respond quickly to target changes, but the gain on the input fluctuates in an unpredictable way.

The equation, $$y_{k+1} = f(y_k, b_k, u_k) = y_k + b_k u_k, \quad (88)$$

where $b_k$ is the unknown gain (effective at time k) and $u_k$ is the applied input, describes the process.

Since b is an unknown parameter, it must be added as an extra state for the purposes of estimation. A standard Kalman estimation scheme can be used by linearizing the system around the current operating point. This is accomplished as described by the following equations:

$$\begin{bmatrix} x \\ b \end{bmatrix}_{k+1} \approx \begin{bmatrix} \frac{\delta f}{\delta x} & \frac{\delta f}{\delta b} \\ 0 & 1 \end{bmatrix} \begin{bmatrix} x \\ b \end{bmatrix}_k + \begin{bmatrix} \frac{\delta f}{\delta u} \\ 0 \end{bmatrix} [u]_k \quad (89)$$

$$[y]_k = [1 \; 0] \begin{bmatrix} x_1 \\ x_2 \end{bmatrix}_k. \quad (90)$$

Note that $$\frac{\delta f}{\delta x_k} = 1, \; \frac{\delta f}{\delta b_k} = u_k, \text{ and } \frac{\delta f}{\delta u_k} = b_k.$$

For this system, the observability test matrix is given by $$O = \begin{bmatrix} 1 & 1 \\ 0 & u_k \end{bmatrix}. \quad (91)$$

Thus, the system is only observable when $u_k$ is not zero. This is important because the steady state operating point has u at zero. The unknown parameter b can only be identified when u is kept away from zero, which is what would be accomplished by a persistent excitation constraint on the controller. This simple example illustrates how a persistent excitation condition can be related to an observability condition.

In general, allowing a state estimator to run at the unobservable point will lead to unpredictable results. However, it is necessary to do feedback control in case there is a disturbance. A Kalman estimation scheme will keep the estimates moving slowly because the estimates are moved only as much as is needed to explain the measurements.

Figure 18:
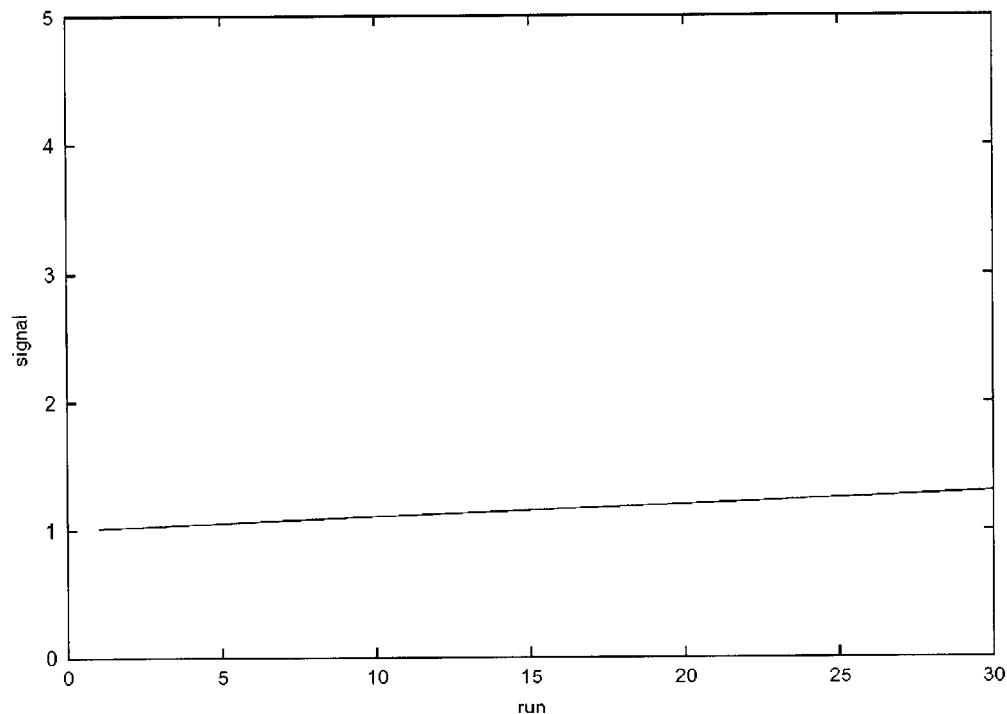

In the following simulations, the process described above was run with different excitation conditions. The first one has no excitation. The second run has a persistent excitation constraint imposed, and the third run has excitation enforced only for a small portion of the time. In all cases, a plant inversion was used by the control law component 132, and a Kalman state estimator was used for the observer component 134. During the course of the simulation, the true value of the gain b is ramping as shown in FIG. 18. Because the plant inversion is used as the control law, errors in state estimation are immediately visible as errors in the controlled output.

Figure 19:
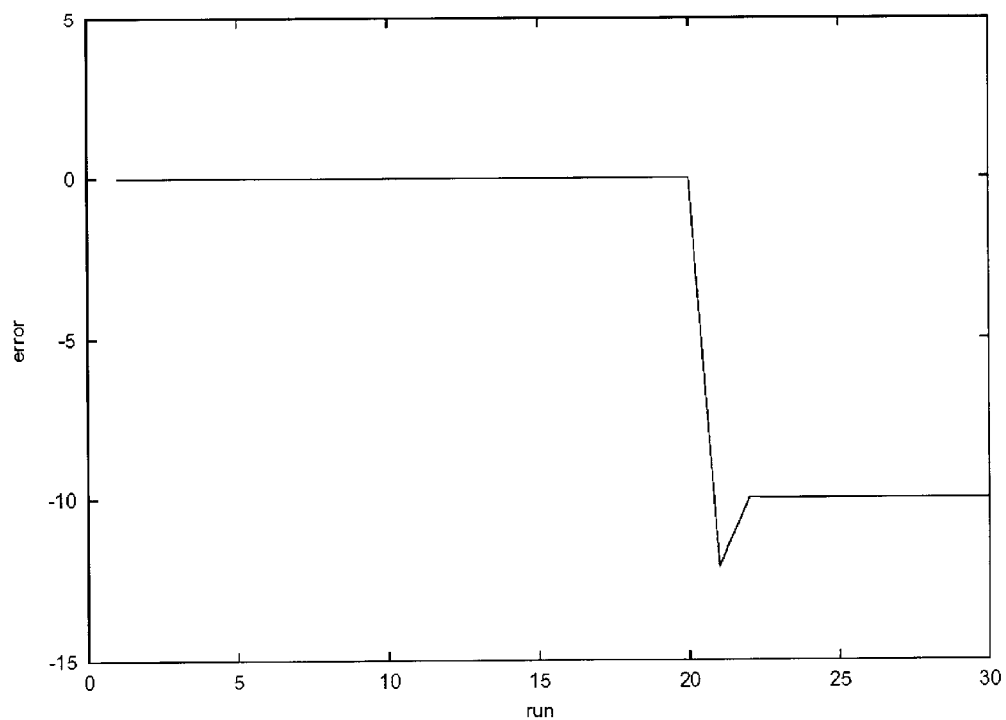

In the first simulation, shown in FIG. 19, the input is not applied until the target changes. Because the gain has changed, there is a significant deviation from the target for the first time step where the new target is in effect. During most of the simulation, the controller 130 is starved for information as there is no way to observe the unknown gain.

Figure 20:
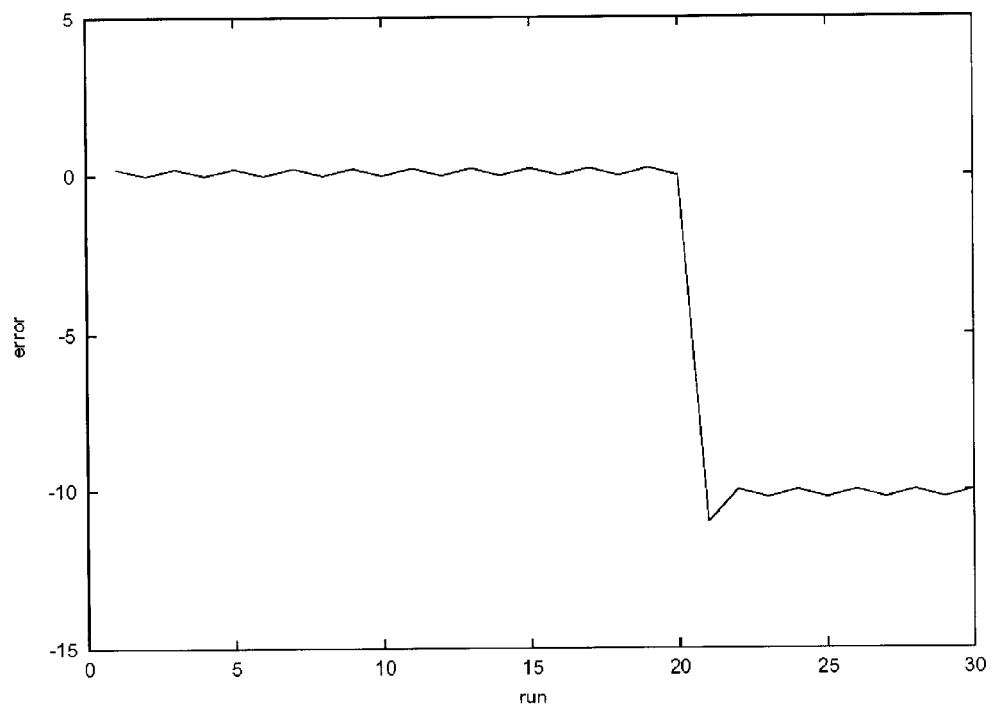

In the second simulation, shown in FIG. 20, a persistent excitation constraint is applied. Here, the input varies enough at each time step so that the gain can be estimated. When the target changes, the controller 130 makes the switch with less error than in the previous case. However, perturbations have been introduced throughout the entire simulation to make the gain apparent.

Figure 21:
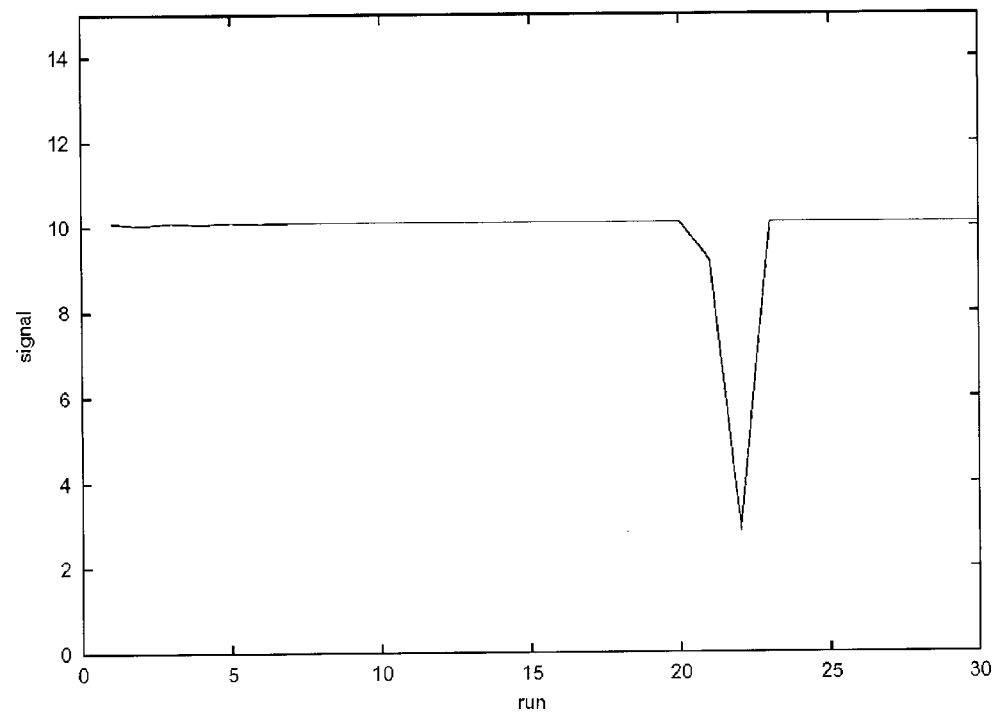
Figure 22:
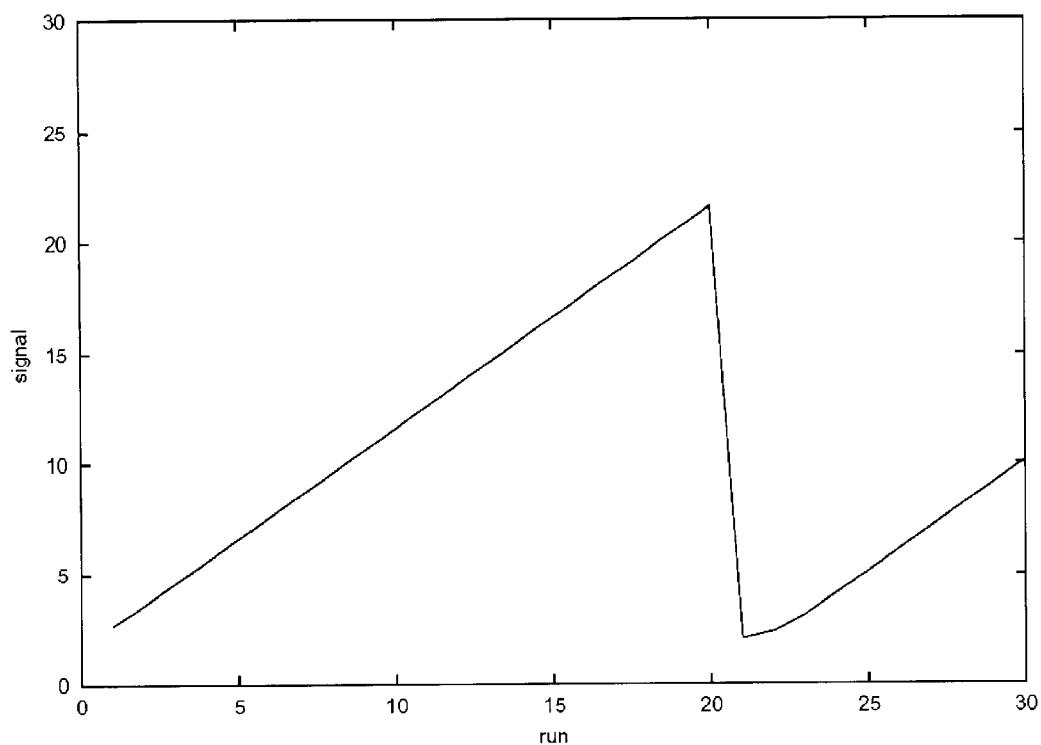
Figure 23:
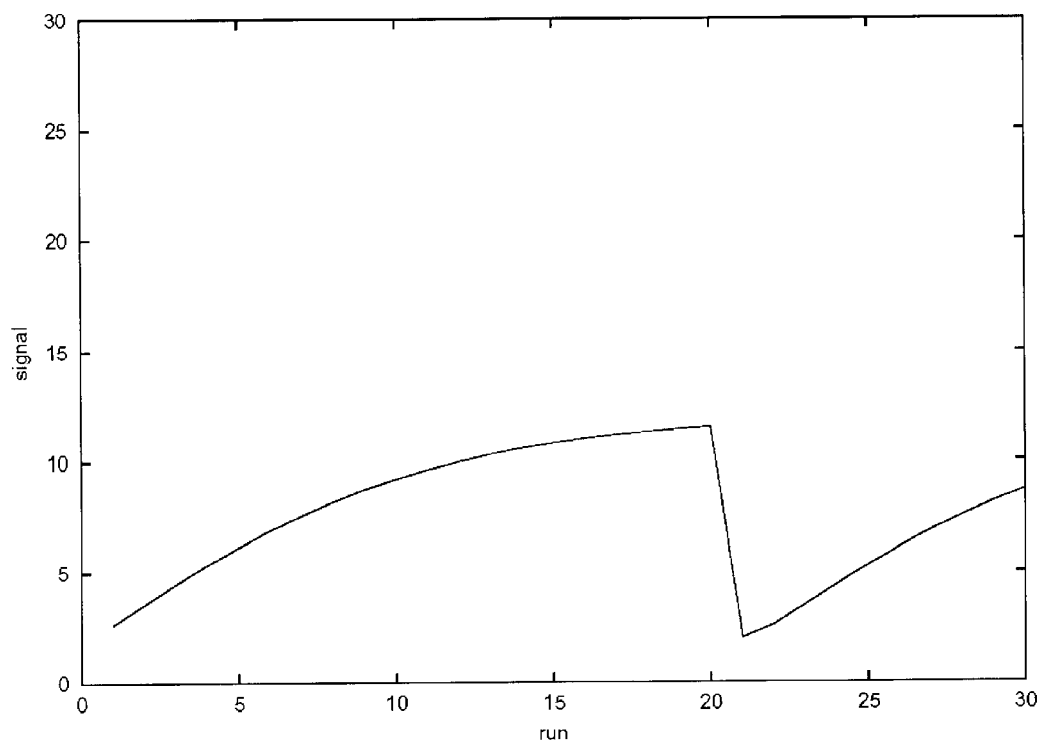

The rank of the observability test matrix is commonly used to test for observability. When this matrix has full rank, its condition number is bounded. In the first simulation, the condition number of the observability test matrix went to infinity because the matrix became rank deficient. By contrast, under persistent excitation, the condition number stays well within reasonable limits. FIG. 21 tracks the condition number of the observability test matrix for the second simulation. Another useful piece of information is the trace of the error covariance matrix used in the state estimation routine. FIGS. 22 and 23 show this value for the first and second simulations, respectively.

Figure 24:
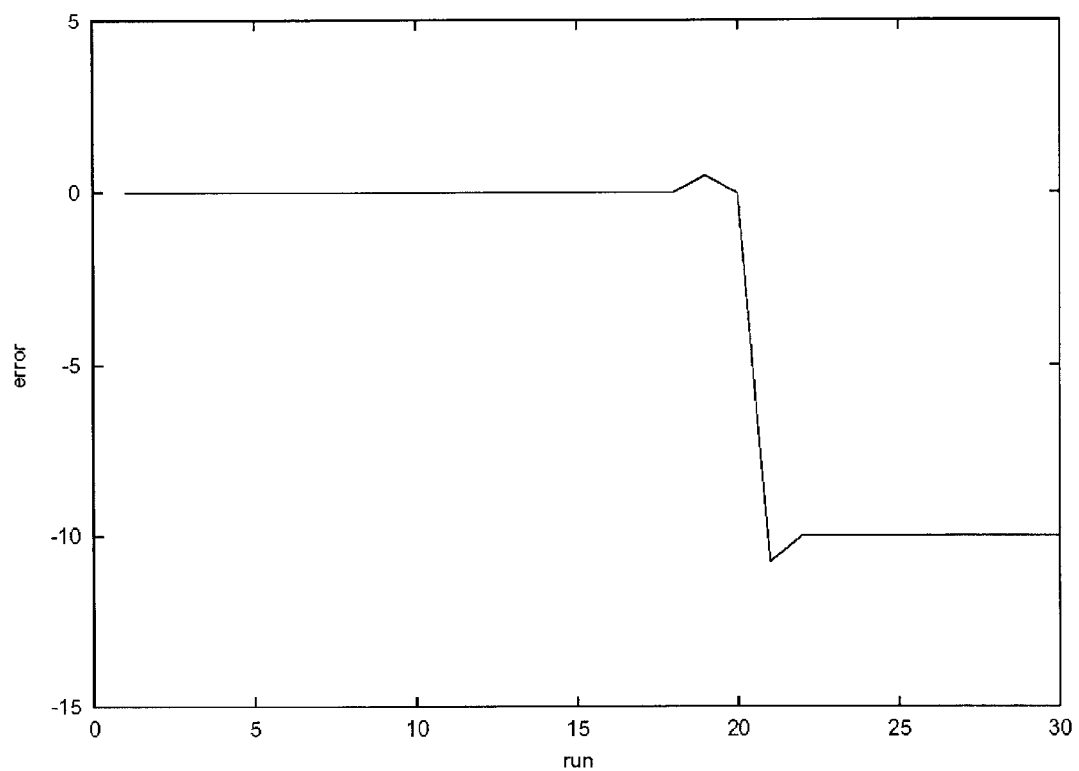

In the third simulation, shown in FIG. 24, it is assumed that it is known ahead of time when the target change will occur. In this case, it is not necessary to perturb the process until the information about the gain is needed. Here everything runs smoothly until the target change is imminent. The target change still happens correctly, and the process it not disturbed until the information is needed.

The case where the process is excited to learn about the parameters is contradictory to what a controller using a pure mean squared error objective would try to obtain. In semiconductor manufacture, a different sort of performance function lends itself to the problem. In general, the devices being manufactured have tolerances for most of the inline targets. As long as the measured value is reasonably close to the target value, the device will function properly. Within the tolerance region, there is very little noticeable difference in the final output characteristics of the device. However, there is a very steep drop-off past which the device simply will not work. An example of this is in the alignment of process layers to make electrical contact. It is possible to have a performance function that mimics this behavior by treating all data points within the tolerance region as good and all points outside as bad. This kind of performance metric is very well matched to an observation scheme involving persistent excitation because the excitation can induce learning while staying safely inside the tolerance region.

The number of data points is not the only thing that matters in determining the efficacy of the controller 130. Each of the preceding simulations had the same number of measurements of the same output variable. The order of the data and the actual values affect the information content. The conditions under which the data are obtained are also important.

It is not necessary to have perfect information all the time. In the second simulation, the correct value of the process gain was known at all times. However, the third simulation was able to control the process just as well with the gain known only at certain times.

In a real process, it is often possible to know about upcoming target changes before then occur. However, the process is also subject to unknown disturbances. In both of these cases, it is important to have enough information to drive the process quickly to the target value. So, clearly there is a balance between learning everything there is to know about the process and letting it run without perturbations.

In the examples above, both the trace of the error covariance matrix and the condition number of the observability test matrix were shown to be indicators of the amount of process information available. These values can be used to create excitation constraints that the controller 130 can use to keep the process observable.

Figure 25:
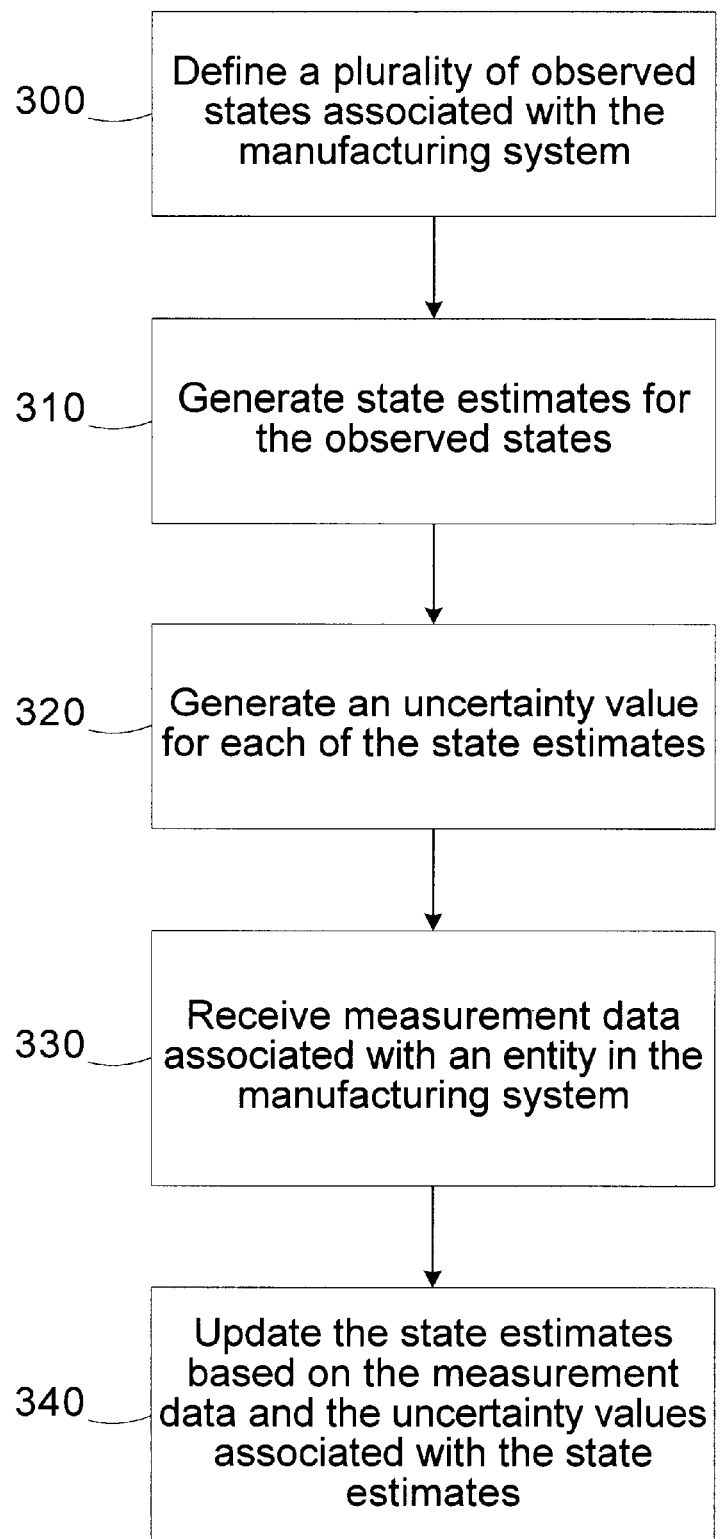
FIG. 25 represents a simplified flow diagram of a method for monitoring a manufacturing system in accordance with yet another embodiment of the present invention.

Turning now to FIG. 25, a simplified flow diagram of a method for monitoring a manufacturing system is provided. In block 300, a plurality of observed states associated with the manufacturing system are defined. In block 310, state estimates are generated for the observed states. In block 320, an uncertainty value is generated for each of the state estimates. In block 330, measurement data associated with an entity in the manufacturing system is received. In block 340, the state estimates are updated based on the measurement data and the uncertainty values associated with the state estimates.

The techniques described herein present a powerful approach to understanding the handling of the many different processes that are simultaneously active in a large-scale semiconductor manufacturing plant. The study of the combined system model reinforces the fact that there is a great deal of data that can be shared between different processes. As the differences between equipment, products, and processes are often much larger than the run-to-run fluctuations of a single process, the combined model succeeds in capturing the differences between the different areas of the process by utilizing data from several runs at a time. The key benefit of this method is that information is shared between different processing contexts so that the system model is updated very quickly when errors are detected.

Another major result is that in a state and parameter estimation algorithm, understanding the amount of uncertainty in the estimates is just as important as obtaining the values of the estimates themselves. A recursive state estimation routine based on estimating confidence levels was proposed to perform updates even when only a portion of the desired measurement data is available. Practical manufacturing issues such as delayed and missing measurements were described and addressed. The result is a robust scheme that is applicable to many different processes in the manufacturing facility.

A distinction was made between the available data and the useful information it contains. The performance of a state estimation scheme is heavily dependent on the quality of the information it receives. The state estimate error covariance matrix was identified as an indicator of the uncertainty in the estimates, and the effects of measurements on that matrix were explained in terms of how the measurements affect the uncertainties in the estimates.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

APENDIX A

Nomenclature

Abbreviations

| | |
|---|---|
| LQG | Linear Quadratic Gaussian |
| MPC | Model Predictive Control |
| MSE | Mean Squared Error |
| SISO | Single Input, Single Output |
| SPC | Statistical Process Control |

Symbols

| | |
|---|---|
| A | Autocorrelation term in state space model |
| B | Input effect term in state space model |
| C | Output mapping term in state space model |
| $C_r$ | Reduced (effective) output mapping matrix |
| G | Noise effect term in state space model |
| L | Observer gain matrix |
| O | Observability matrix |
| P | State error covariance |
| Q | Model process error covariance matrix |
| R | Measurement covariance matrix |
| $R_r$ | Reduced (effective) measurement covariance matrix |
| u | System input vector |
| v | Measurement error vector |

APENDIX A-continued

Nomenclature

| | |
|---|---|
| w | Process error vector |
| x | System state vector |
| x̂ | Estimate of system state vector |
| x_old | Estimate of system state vector before an event |
| x_new | Estimate of system state vector after an event |
| y | System output vector |

What is claimed:

1. A method for monitoring a manufacturing system, comprising:
 defining a plurality of observed states associated with the manufacturing system;
 generating state estimates for the observed states;
 generating an uncertainty value for each of the state estimates;
 receiving measurement data including associated with an entity in the manufacturing system, including a first measurement associated with a first processing event;
 generating a first output mapping based on the measurement data;
 updating the state estimates based on the first output mapping, the measurement data and the uncertainty values associated with the state estimates;
 receiving a second measurement associated with a second processing event occurring after the first processing event;
 generating a second output mapping based on the second measurement; and
 updating the state estimates based on the second output mapping, the second measurement, and the associated uncertainty values.

2. The method of claim 1, further comprising generating a state estimate matrix including the state estimates.

3. The method of claim 2, further comprising generating a covariance matrix associated with the state estimate matrix, the covariance matrix including the uncertainty values.

4. The method of claim of claim 3, wherein generating the covariance matrix further comprises generating the covariance matrix including the uncertainty values as diagonal terms.

5. The method of claim of claim 4, wherein generating the covariance matrix further comprises generating the covariance matrix including off-diagonal terms defining interdependency relationships amongst the observed states.

6. The method of claim 1, further comprising:
 performing a processing step in the manufacturing system; and
 updating each of state estimates based on the processing step and the associated uncertainty values.

7. The method of claim 1, wherein the manufacturing system includes a plurality of tools, and defining the plurality of observed states further comprises defining at least one tool state.

8. The method of claim 1, wherein the manufacturing system is configured to process a plurality of products and defining the plurality of observed states further comprises defining at least one product state.

9. The method of claim 1, wherein the manufacturing system includes a plurality of tools configured to process a plurality of products and defining the plurality of observed states further comprises defining at least one tool state and at least one product state.

10. The method of claim 1, wherein the manufacturing system includes a plurality of tools configured to perform a plurality of processes associated with a plurality of products and defining the plurality of observed states further comprises defining an observed state for each product/process combination.

11. The method of claim 1, further comprising updating the state estimates using a Kalman filter.

12. A method for monitoring a manufacturing system, comprising:
 defining a plurality of observed states associated with the manufacturing system;
 generating state estimates for the observed states;
 generating a state estimate matrix including the state estimates;
 generating an uncertainty value for each of the state estimates;
 generating a covariance matrix associated with the state estimate matrix, the covariance matrix including the uncertainty values;
 receiving measurement data associated with an entity in the manufacturing system;
 updating the state estimates based on the measurement data and the uncertainty values associated with the state estimates;
 identifying an additional observed state associated with the manufacturing system;
 generating an initial state estimate for the additional observed state; and
 merging the initial state estimate with the state estimate matrix.

13. The method of claim 12, further comprising:
 generating an initial covariance estimate for the additional observed state; and
 merging the initial covariance estimate with the covariance matrix.

14. The method of claim 13, wherein the covariance matrix includes a diagonal term associated with the additional observed state and generating the initial covariance estimate includes setting the initial covariance estimate higher than corresponding diagonal terms for other observed states.

15. The method of claim 13, wherein the covariance matrix includes a plurality of off-diagonal terms associated with the additional observed state and generating the initial covariance estimate includes setting the off-diagonal terms to zero.

16. A method for monitoring a manufacturing system, comprising:
 defining a plurality of observed states associated with the manufacturing system;
 generating state estimates for the observed states;
 generating an uncertainty value for each of the state estimates;
 receiving measurement data associated with an entity in the manufacturing system;
 updating the state estimates based on the measurement data and the uncertainty values associated with the state estimates;
 identifying a set of initial state estimates at a first time;
 maintaining a queue of events associated with the manufacturing system occurring after the first time, the events including process events and measurement events;

receiving a first measurement event;

identifying one of the process events associated with the first measurement event;

selecting events occurring after the identified process event; and iteratively updating the initial state estimates based on the first measurement event and the selected set of events.

17. The method of claim 16, further comprising retiring events from the queue after a predetermined time interval.

18. The method of claim 16, further comprising retiring a selected process event responsive to not receiving a measurement event associated with the selected process event after a predetermined time interval.

19. A system for monitoring a manufacturing system, comprising a controller configured to define a plurality of observed states associated with the manufacturing system, generate state estimates for the observed states, generate a state estimate matrix including the state estimates, generate an uncertainty value for each of the state estimates, generate a covariance matrix associated with the state estimate matrix, the covariance matrix including the uncertainty value receive measurement data associated with an entity in the manufacturing system, update the state estimates based on the measurement data and the uncertainty values associated with the state estimates, identify an additional observed state associated with the manufacturing system, generate an initial state estimate for the additional observed state, and merge the initial state estimate with the state estimate matrix.

20. The system of claim 19, wherein the controller is further configured to generate an initial covariance estimate for the additional observed state and merge the initial covariance estimate with the covariance matrix.

21. The system of claim 20, wherein the covariance matrix includes a diagonal term associated with the additional observed state and the controller is further configured to set the initial covariance estimate higher than corresponding diagonal terms for other observed states.

22. The system of claim 20, wherein the covariance matrix includes a plurality of off-diagonal terms associated with the additional observed state and the controller is further configured to set the off-diagonal terms to zero.

23. A system for monitoring a manufacturing system, comprising a controller configured to define a plurality of observed states associated with the manufacturing system, generate state estimates for the observed states, generate an uncertainty value for each of the state estimates, receive measurement data associated with an entity in the manufacturing system, update the state estimates based on the measurement data and the uncertainty values associated with the state estimates, identify a set of initial state estimates at a first time, maintain a queue of events associated with the manufacturing system occurring after the first time, the events including process events and measurement events, receive a first measurement event, identify one of the process events associated with the first measurement event, select events occurring after the identified process event, and iteratively update the initial state estimates based on the first measurement event and the selected events occurring after the identified process event.

24. The system of claim 23, the controller is further configured to retire events from the queue after a predetermined time interval.

25. The system of claim 23, the controller is further configured to retire a selected process event responsive to not receiving a measurement event associated with the selected process event after a predetermined time interval.

26. A system for monitoring a manufacturing system, comprising a controller configured to define a plurality of observed states associated with the manufacturing system, generate state estimates for the observed states, generate an uncertainty value for each of the state estimates, receive measurement data associated with an entity in the manufacturing system including a first measurement associated with a first processing event, generate a first output mapping based on first measurement, update the state estimates based on the first output mapping, first measurement, and the uncertainty values associated with the state estimates, receive a second measurement associated with a second processing event occurring after the first processing event, generate a second output mapping based on the second measurement, and update the state estimates based on the second output mapping, the second measurement, and the associated uncertainty values.

27. The system of claim 26, wherein the controller is further configured to generate a state estimate matrix including the state estimates.

28. The system of claim 27, wherein the controller is further configured to generate a covariance matrix associated with the state estimate matrix, the covariance matrix including the uncertainty values.

29. The system of claim of claim 28, wherein the controller is further configured to generate the covariance matrix including the uncertainty values as diagonal terms.

30. The system of claim of claim 29, wherein the controller is further configured to generate the covariance matrix including off-diagonal terms defining interdependency relationships amongst the observed states.

31. The system of claim 26, further comprising:

a process tool configured to perform a processing step in the manufacturing system, wherein the controller is further configured to update each of state estimates based on the processing step and the associated uncertainty values.

32. The system of claim 26, wherein the manufacturing system includes a plurality of tools, and the controller is further configured to define at least one tool state.

33. The system of claim 26, wherein the manufacturing system is configured to process a plurality of products and the controller is further configured to define at least one product state.

34. The system of claim 26, wherein the manufacturing system includes a plurality of tools configured to process a plurality of products and the controller is further configured to define at least one tool state and at least one product state.

35. The system of claim 26, wherein the manufacturing system includes a plurality of tools configured to perform a plurality of processes associated with a plurality of products and the controller is further configured to define an observed state for each product/process combination.

36. The system of claim 26, the controller is further configured to update the state estimates using a Kalman filter.

37. A system for monitoring a manufacturing system, comprising:

means for defining a plurality of observed states associated with the manufacturing system;

means for generating state estimates for the observed states;

means for generating an uncertainty value for each of the state estimates;

means for receiving measurement data associated with an entity in the manufacturing system including a first measurement associated with a first processing event;

means for generating a first output mapping based on the measurement data;

means for updating the state estimates based on the first output mapping, the measurement data, and the uncertainty values associated with the state estimates;

means for receiving a second measurement associated with a second processing event occurring after the first processing event;

means for generating a second output mapping based on the second measurement; and means for updating the state estimates based on the send output mapping, the second measurement, and the associated uncertainty values.

* * * * *